US012594886B2

(12) United States Patent
Baek

(10) Patent No.: US 12,594,886 B2
(45) Date of Patent: Apr. 7, 2026

(54) VEHICLE AND CONTROL METHOD THEREOF

(71) Applicants:Hyundai Motor Company, Seoul (KR); Kia Corporation, Seoul (KR)

(72) Inventor: Jooam Baek, Gwangmyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 356 days.

(21) Appl. No.: 18/345,397

(22) Filed: Jun. 30, 2023

(65) Prior Publication Data

US 2024/0174177 A1 May 30, 2024

(30) Foreign Application Priority Data

Nov. 25, 2022 (KR) ......................... 10-2022-0160549

(51) Int. Cl.
B60R 1/074 (2006.01)

(52) U.S. Cl.
CPC .......... B60R 1/074 (2013.01); B60R 2300/80 (2013.01)

(58) Field of Classification Search
None
See application file for complete search history.

(56) References Cited

U.S. PATENT DOCUMENTS

| 9,478,848 B2 * | 10/2016 | Nagata | .................... H01Q 21/28 |
| 2013/0293974 A1 * | 11/2013 | Hartmann | ............... B60R 1/074 |
| | | | 359/841 |

| 2015/0284984 A1 * | 10/2015 | Kanter | .................... E05F 15/74 |
| | | | 49/31 |
| 2017/0054842 A1 * | 2/2017 | Choi | .................. H04M 1/72463 |
| 2018/0022314 A1 * | 1/2018 | Ji | ........................... B60R 25/245 |
| | | | 340/5.61 |
| 2018/0134212 A1 * | 5/2018 | McNabb | ................ G06V 20/56 |
| 2019/0007810 A1 * | 1/2019 | Santavicca | .............. H04W 4/80 |
| 2020/0047715 A1 * | 2/2020 | Park | ...................... B60R 25/245 |
| 2020/0189460 A1 * | 6/2020 | Park | ...................... B60R 11/04 |
| 2021/0188172 A1 * | 6/2021 | Han | ....................... B60W 30/09 |

FOREIGN PATENT DOCUMENTS

KR 20170052881 A * 5/2017 ......... B60R 25/1012

OTHER PUBLICATIONS

Machine translation of KR-20170052881-A (Year: 2017).*

* cited by examiner

*Primary Examiner* — Anne Marie Antonucci
*Assistant Examiner* — Kyle S Park
(74) *Attorney, Agent, or Firm* — Slater Matsil, LLP

(57) ABSTRACT

An embodiment vehicle includes a side mirror, a communicator, and a controller. The communicator may be configured to transmit a search signal to a remote controller through the plurality of antennas and to receive a response signal transmitted from the remote controller as a response to the search signal. The controller may be electrically coupled to the side mirror, configured to determine whether a driver is present within a search area of the first antenna according to the driver carrying the remote controller and approaching the parked vehicle being detected, determine a location of the driver based on an intensity of the response signal received from the remote controller as a response to the search signal transmitted from the first antenna, and signal the side mirror whether to convert into a folded state or an unfolded state based on the determined location of the driver.

20 Claims, 19 Drawing Sheets

<u>100</u>

VEHICLE AND CONTROL METHOD THEREOF

CROSS-REFERENCE TO RELATED APPLICATIONS

This application is based on and claims priority under 35 U.S.C. § 119 to Korean Patent Application No. 10-2022-0160549, filed on Nov. 25, 2022, in the Korean Intellectual Property Office, the disclosure of which is incorporated by reference herein in its entirety.

TECHNICAL FIELD

The present disclosure relates to a vehicle capable of automatically controlling folding and unfolding of side mirrors and a control method thereof.

BACKGROUND

Recently, consumers have a lot of interest in additional service devices as well as vehicle performance and design, and a welcome system using a smart key function among various service devices installed in vehicles is becoming an issue as a technology that highlights communication between a vehicle and a user.

Such a welcome system executes a welcome mirror function in which folded side mirrors are automatically unfolded when a driver approaches a vehicle with a smart key.

When other vehicles are tightly parked on opposite sides of the vehicle in a parking lot and the welcome mirror function is executed and the side mirrors are unfolded, inconvenience and discomfort may be caused to the user. For example, when another vehicle is parked tightly on the side of a driver seat of the vehicle and the driver passes between them to get to the driver seat, but the side mirror is unfolded by the welcome mirror function, the side mirror may obstruct driver passage and may be contacted by the driver, so that inconvenience and discomfort may be caused to the user.

SUMMARY

Embodiments of the present disclosure may provide a vehicle and a control method thereof capable of preventing interference between side mirrors unfolded by a welcome mirror function and a driver by appropriately controlling folding/unfolding of the side mirrors based on a location of the driver approaching a parked vehicle.

An embodiment may provide a vehicle and a control method thereof capable of preventing interference between side mirrors unfolded by a welcome mirror function and a driver and/or passengers by appropriately controlling folding/unfolding of the side mirrors based on locations of the driver and passengers approaching a parked vehicle.

Embodiments and example will be set forth in part in the description which follows and, in part, may be understood based the description, or may be learned by practice of an embodiment.

In accordance with an embodiment of the disclosure, a vehicle includes a side mirror provided to be converted into a folded or unfolded state, a communicator including a plurality of antennas including a first antenna mounted on a driver seat side, and configured to transmit a search signal to a remote controller through the plurality of antennas and to receive a response signal transmitted from the remote controller as a response to the search signal, and a controller electrically connected to the side mirror, wherein the controller, when a driver carrying the remote controller that is approaching the parked vehicle is detected, determines whether the driver is present within a search area of the first antenna, determines a location of the driver based on an intensity of the response signal received from the remote controller as a response to the search signal transmitted from the first antenna, and converts the side mirror into the folded state or the unfolded state based on the location of the driver.

In an embodiment, the controller may determine that the driver is in a location before passing the side mirror when the driver is present within the search area and the intensity of the response signal is less than a threshold value, and determine that the driver is in a location where the driver has passed the side mirror when the driver is present within the search area and the intensity of the response signal is greater than a threshold value.

In an embodiment, the vehicle may further include a surround view camera provided to have a field of view facing the periphery of the vehicle and obtain surrounding image data, wherein the controller may divide a surround view image created from the surrounding image data into a driver seat front fender area, a driver seat door area, a front passenger seat front fender area, and a front passenger seat door area based on the side mirror, determine whether a motion is detected in each area based on pixel changes in each area or at least one of the areas, and determine that the driver is in a location after passing the side mirror when the driver is present within the search area, the intensity of the response signal is greater than the threshold value, and a motion is detected in the driver seat door area.

In an embodiment, the controller may determine that the passenger is in a location before passing the side mirror when a motion is detected in at least one of the driver seat front fender area and the front passenger seat front fender area when the driver is in a location after passing the side mirror, and determine that the passenger is in a location after passing the side mirror when the motion is released in the area where the motion is detected.

In an embodiment, the controller may maintain the side mirror in the folded state when the driver is in a location after passing the side mirror and the passenger is in a location before passing the side mirror.

In an embodiment, the controller may convert the side mirror from the folded state to the unfolded state when both of the driver and passenger are in a location after passing the side mirror.

In an embodiment, the controller may maintain the side mirror in the folded state when the driver is in a location before passing the side mirror, and convert the side mirror from the folded state to the unfolded state when the driver is in a location after passing the side mirror.

In an embodiment, the controller may maintain the side mirror in the folded state when the driver approaches from the front in the direction of a front passenger seat.

In an embodiment, the controller may convert the side mirror from the folded state to the unfolded state when the driver approaches from the rear.

In an embodiment, the controller may determine whether the driver carrying the remote controller is approaching based on mounting positions of the plurality of antennas and the intensity of the response signal of the remote controller.

In an embodiment, the controller may determine the location of the driver when an interval between the vehicle and a vehicle parked on at least one of the left and right sides of the vehicle is shorter than a preset interval.

In accordance with an embodiment of the disclosure, a vehicle includes a side mirror provided to be converted into a folded or unfolded state, a communicator including a plurality of antennas including an internal antenna mounted in the inside of the vehicle, and configured to transmit a search signal to a remote controller through the plurality of antennas and to receive a response signal transmitted from the remote controller as a response to the search signal, a surround view camera provided to have a field of view facing the periphery of the vehicle and obtain surrounding image data, and a controller electrically connected to the side mirror, wherein the controller, when a driver carrying the remote controller is present within a search area of the internal antenna, divides a surround view image created from the surrounding image data into a plurality of areas including a driver seat front fender area and a front passenger seat front fender area based on the side mirror, determines whether a motion is detected in each area based on pixel changes in each area or at least one of the areas, determines a location of a passenger based on a change in motion detection in at least one of the driver seat front fender area and the front passenger seat front fender area, and converts the side mirror into the folded state or the unfolded state based on the location of the passenger.

In an embodiment, the controller may determine that the passenger is in a location before passing the side mirror when a motion is detected in at least one of the driver seat front fender area and the front passenger seat front fender area, and determine that the passenger is in a location after passing the side mirror when the motion is released in the area where the motion is detected.

In an embodiment, the controller may convert the side mirror from the unfolded state to the folded state when the passenger is in a location before passing the side mirror, and convert the side mirror from the folded state to the unfolded state when the passenger is in a location after passing the side mirror.

In accordance with an embodiment of the disclosure, a control method of a vehicle, which includes a side mirror provided to be converted into a folded or unfolded state, and a communicator including a plurality of antennas including a first antenna mounted on a driver seat side and configured to transmit a search signal to a remote controller through the plurality of antennas and receive a response signal transmitted from the remote controller as a response to the search signal, includes determining whether a driver is present within a search area of the first antenna when the driver carrying the remote controller that is approaching the parked vehicle is detected, determining a location of the driver based on an intensity of the response signal received from the remote controller as a response to the search signal transmitted from the first antenna, and converting the side mirror into the folded state or the unfolded state based on the location of the driver.

In an embodiment, the determining of the location of the driver may include determining that the driver is in a location before passing the side mirror when the driver is present within the search area and the intensity of the response signal is less than a threshold value, dividing a surround view image of the vehicle into a driver seat front fender area, a driver seat door area, a front passenger seat front fender area, and a front passenger seat door area based on the side mirror, determining whether a motion is detected in each area based on pixel changes in each area, and determining that the driver is in a location after passing the side mirror when the driver is present within the search area, the intensity of the response signal is greater than the threshold value, and a motion is detected in the driver seat door area.

In an embodiment, the determining of the location of the driver may include determining that the passenger is in a location before passing the side mirror when a motion is detected in at least one of the driver seat front fender area and the front passenger seat front fender area when the driver is in a location after passing the side mirror, and determining that the passenger is in a location after passing the side mirror when the motion is released in the area where the motion is detected.

In an embodiment, the converting of the side mirror into the folded state or the unfolded state may include maintaining the side mirror in the folded state when the driver is in a location after passing the side mirror and the passenger is in a location before passing the side mirror.

In an embodiment, the converting of the side mirror into the folded state or the unfolded state may include converting the side mirror from the folded state to the unfolded state when both of the driver and passenger are in a location after passing the side mirror.

In an embodiment, the converting of the side mirror into the folded state or the unfolded state may include maintaining the side mirror in the folded state when the driver is in a location before passing the side mirror, and converting the side mirror from the folded state to the unfolded state when the driver is in a location after passing the side mirror.

BRIEF DESCRIPTION OF THE DRAWINGS

These and/or other embodiments of the disclosure may become apparent and more readily appreciated from the following description of the embodiments, taken in conjunction with the accompanying drawings of which.

DETAILED DESCRIPTION OF ILLUSTRATIVE EMBODIMENTS

Figure 1:
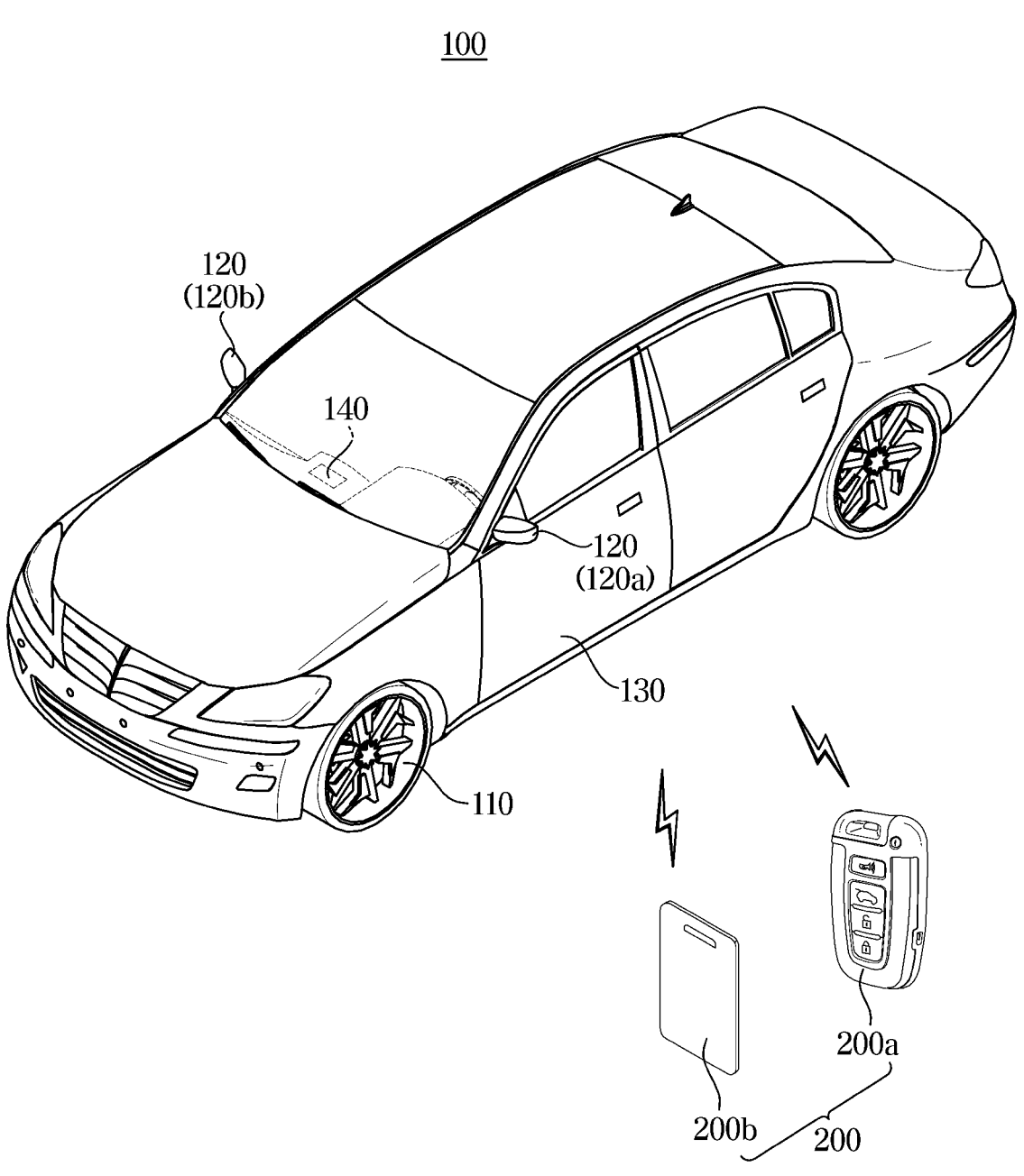
FIG. 1 is a view schematically illustrating a vehicle and a remote controller according to an embodiment.

Throughout the specification, like reference numerals refer to like elements. This specification does not describe all the elements of the embodiments, and duplicative contents between general contents or embodiments in the technical field of the present disclosure may be omitted. The terms 'unit,' 'module,' 'member,' and 'block' used in this specification may be embodied as software or hardware, and it is also possible for a plurality of 'units,' 'modules,' 'members,' and 'blocks' to be embodied as one component, or one 'unit,' 'module,' 'member,' and 'block' to include a plurality of components according to embodiments.

Throughout the specification, when a part is referred to as being "connected" or "coupled" to another part, it includes not only a direct connection but also an indirect connection, and the indirect connection includes connecting through a wireless network.

Also, when it is described that a part "includes" an element, it means that the element may further include other elements, not excluding the other elements unless specifically stated otherwise.

Throughout the specification, when a member is described as being "on" another member, this includes not only a case in which a member is in contact with another member but also a case in which another member is present between the two members.

The terms 'first,' 'second,' etc. are used to distinguish one element from another element, and the elements are not limited by the above-mentioned terms. The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states a particular order.

Figure 2:
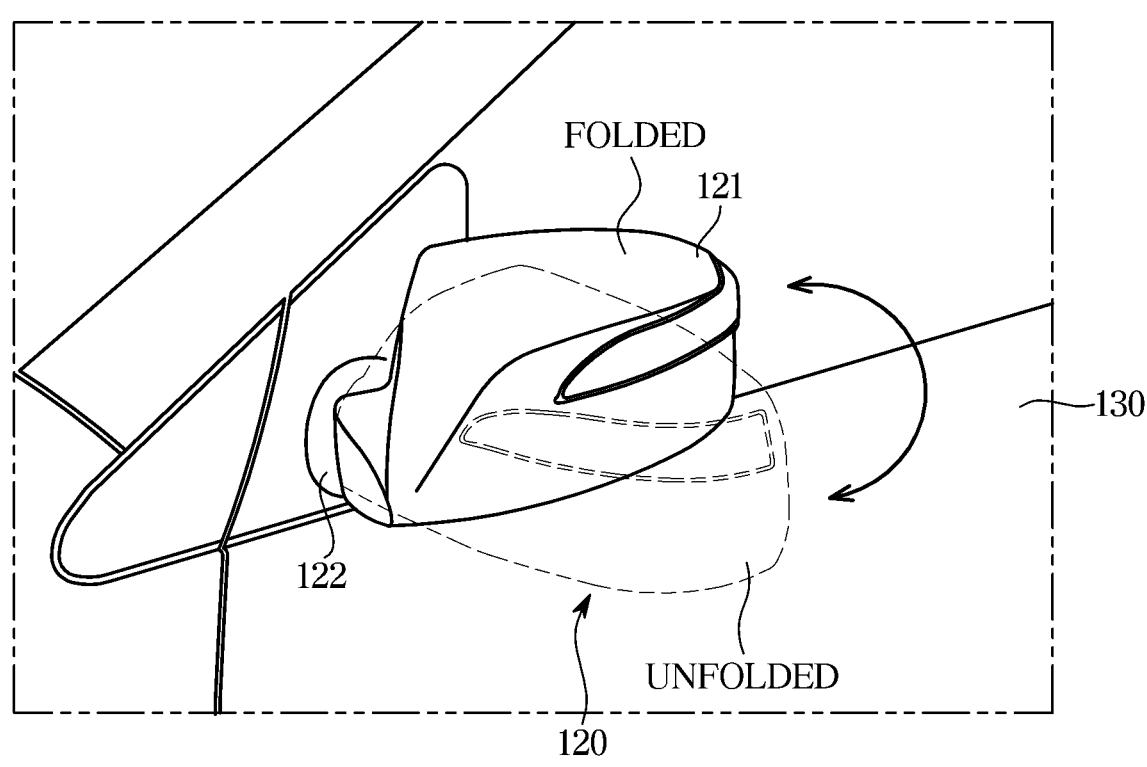
FIG. 2 is a view illustrating a side mirror provided in a vehicle according to an embodiment.
Figure 3:
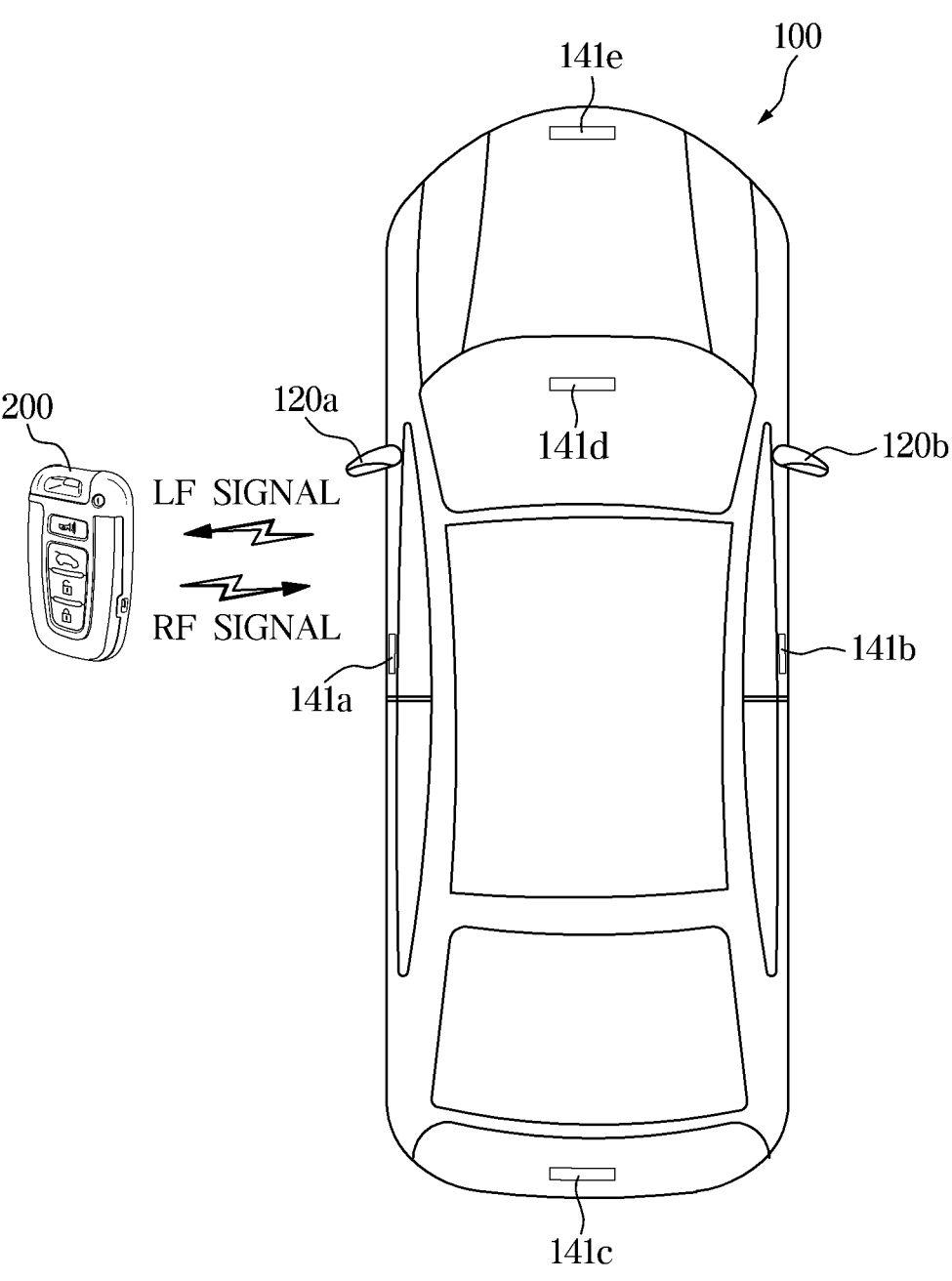
FIG. 3 is a view illustrating antennas disposed in the vehicle according to an embodiment.
Figure 4:
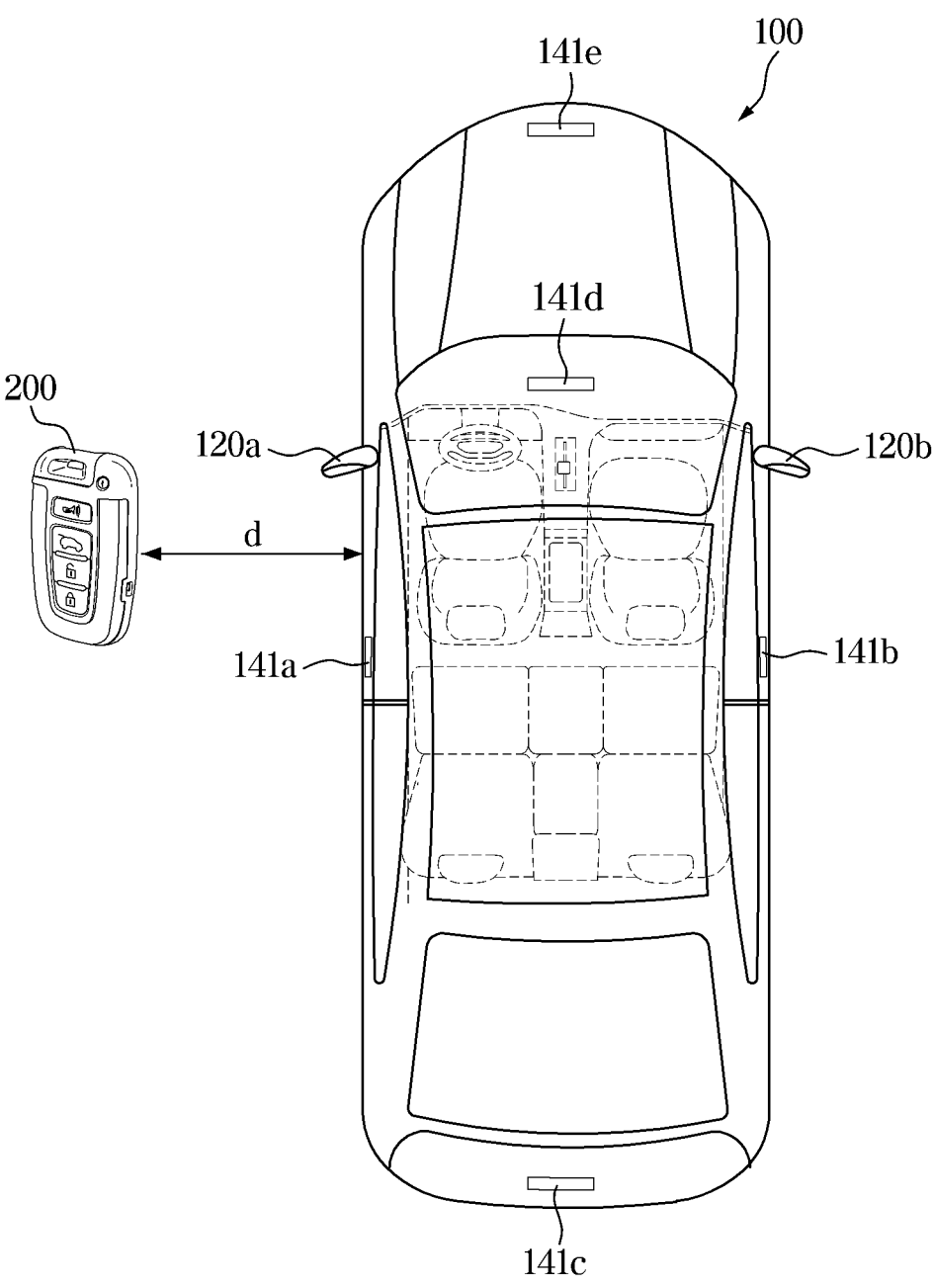
FIG. 4 is a view for explaining communication between the vehicle and the remote controller according to an embodiment.

FIG. 1 is a view schematically illustrating a vehicle and a remote controller according to an embodiment. FIG. 2 is a view illustrating a side mirror provided on a vehicle according to an embodiment. FIG. 3 is a view illustrating antennas located on the vehicle according to an embodiment. FIG. 4 is a view for explaining communication between the vehicle and the remote controller according to an embodiment.

Referring to FIGS. 1 to 4, a vehicle 100 may perform communication with remote controller 200 (such as example variations of controllers 200a and 200b shown in FIG. 1).

The vehicle 100 may include wheels 110 to move the vehicle 100, side mirrors 120 to provide a field of view of the rear of the vehicle 100 to the driver, and doors 130 to shield the inside of the vehicle from the outside.

The side mirrors 120 may include a first side mirror 120a provided on the outside of a driver seat door and a second side mirror 120b provided on the outside of a front passenger seat door, as shown in FIG. 1.

The first and second side mirrors 120a and 120b may perform folding and unfolding operations, as illustrated in FIG. 2. For example, the first and second side mirrors 120a and 120b may be automatically folded or unfolded in response to a lock/unlock command of the door 130 of the vehicle 100, a start on/off command, or a welcome mirror function.

As shown in FIG. 2, the side mirrors 120a and 120b each include a housing 121 forming an external appearance and a mirror member provided inside the housing 121 such that a reflective surface is exposed to the outside. In order to minimize wind resistance acting on the side mirrors 120a and 120b, the housing 121 may be formed in a curved shape.

The mirror members of the side mirrors 120a and 120b may be provided inside the housing 121 such that the reflective surface reflecting an image of an object at the rear of the vehicle is exposed to the outside.

The side mirrors 120a and 120b may include adjusting members 122 (on the driver and passenger sides, one for each side mirror 120) for the folding and unfolding operations. The adjusting members 122 may include a motor as an actuator. The side mirrors 120a and 120b may maintain a folded state in a parked state of the vehicle 100 and an unfolded state while the vehicle 100 is driving in response to operations of the adjusting members 122.

The vehicle 100 may include a power system, a braking system, a steering system, and the like for applying a driving force, a braking force, and a steering force, respectively, to the wheels 110, and may further include a suspension system, a transmission system, and the like.

The remote controller 200 may include a Fob-type remote controller 200a and a card-type remote controller 200b, and may perform two-way communication with the vehicle 100.

The remote controller 200 is wirelessly connected to the vehicle 100 to release door locks or enable starting and driving, for example.

The remote controller 200 may have pre-stored authentication information for connection with the vehicle 100.

The remote controller 200 and the vehicle 100 may transmit and receive signals to each other through a low frequency (LF) communication network and a radio frequency (RF) communication network in order to perform a mutual authentication procedure, for example.

The LF communication network, which may be a communication network of a low frequency band used to transmit an LF signal for the vehicle 100 to scan and/or authenticate the remote controller 200, may be, for example, a communication network having a frequency band of 20 kHz to 150 kHz. When a LF signal is transmitted and received through the LF communication network, due to the characteristics of the low frequency band, a possible transmission/reception distance of the signal is shorter than a possible transmission/reception distance of the RF communication network having a high frequency band (e.g., 315 MHz to 433 MHz). For example, in an embodiment, the possible transmission/reception distance of a LF signal may be about 5 m, and the possible transmission/reception distance of a RF signal may be about 100 m.

Accordingly, the vehicle 100 may request information necessary for authentication of the remote controller 200 close to the vehicle 100 by transmitting an LF signal through the LF communication network.

The vehicle 100 may include a communicator 140 provided to perform communication with the remote controller 200 (see, e.g., FIG. 1).

Figure 6:
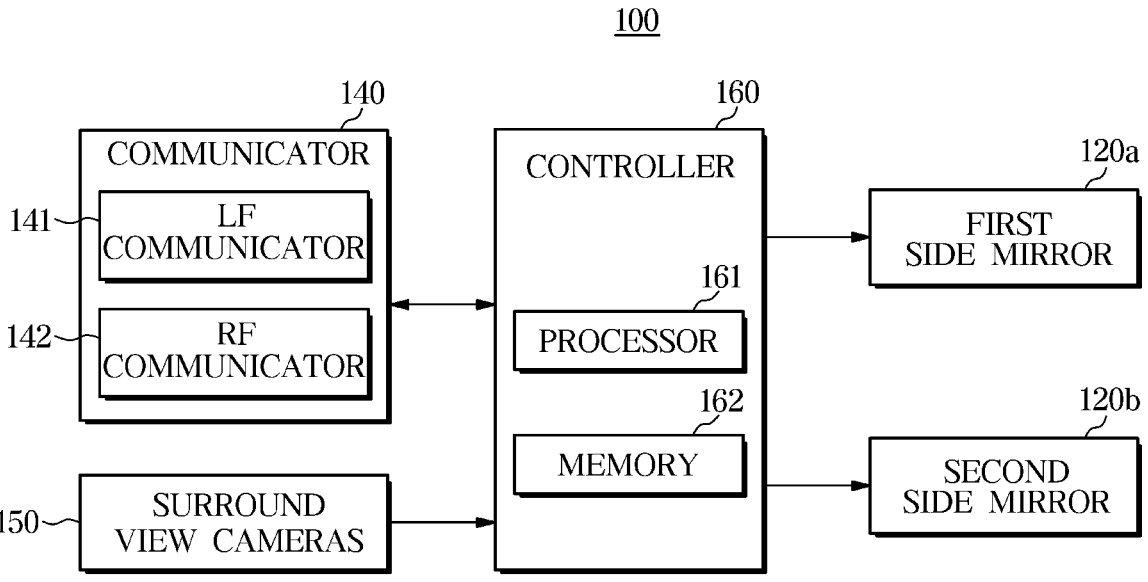
FIG. 6 is a control block diagram of the vehicle according to an embodiment.

Referring to FIG. 6, the communicator 140 may include an LF communicator 141 to transmit and receive an LF signal, and an RF communicator 142 to receive an RF signal transmitted from the remote controller 200.

As shown in FIGS. 3 and 4, the LF communicator 141 may include a plurality of LF antennas 141a to 141e.

The LF antennas 141a to 141e are provided on a front, rear, left side, right side, and inside of the vehicle 100 to transmit LF signals with various angles and intensities.

For example, the LF antennas 141a to 141e may include the first antenna 141a provided on a door handle of a driver seat side, the second antenna 141b provided on a door handle of a front passenger seat side, the third antenna 141*c* provided on a tailgate or rear panel, the fourth antenna 141*d* provided on a front side of the inside of the vehicle 100, and the fifth antenna 141*e* provided on a bonnet or front panel of the vehicle 100. However, these are illustrative examples, as the mounting positions and number of the LF antennas 141*a* to 141*e* are not limited thereto.

When the vehicle 100 transmits LF signals through the LF antennas 141*a* to 141*e*, the remote controller 200 may receive the LF signals of the respective LF antennas 141*a* to 141*e*.

The RF communication network, which is a communication network of a high frequency band for the vehicle 100 to receive an RF response signal from the remote controller 200 receiving the LF signal, may be, for example, a communication network having a frequency band of 315 MHz to 433 MHz. In an embodiment, when the RF response signal is transmitted and received through the RF communication network, possible transmission/reception distance of the signal may be longer than the possible transmission/reception distance of the LF communication network having the low frequency band.

The remote controller 200 may transmit the RF response signal to the vehicle 100. Upon receiving the LF signal from the vehicle 100 when performing the mutual authentication procedure, the remote controller 200 may respond to an authentication request of the vehicle 100 by transmitting authentication information as the RF response signal to the vehicle 100 through the RF communication network in response to the LF signal. Accordingly, the vehicle 100 may receive the RF response signal transmitted from the remote controller 200 through the RF communicator 142.

When the remote controller 200 approaches a reference distance d or less, the vehicle 100 may execute the welcome mirror function to convert the folded side mirrors 120*a* and 120*b* into the unfolded state. At this time, the vehicle 100 may turn on a puddle lamp, which is a welcome light.

In an embodiment, when performing an unfolding control of the side mirrors 120*a* and 120*b* by executing the welcome mirror function, the vehicle 100 may recognize a location of the driver and limit unfolding of the side mirrors 120*a* and 120*b* based on the recognized location of the driver. This will be explained in more detail below.

Figure 5:
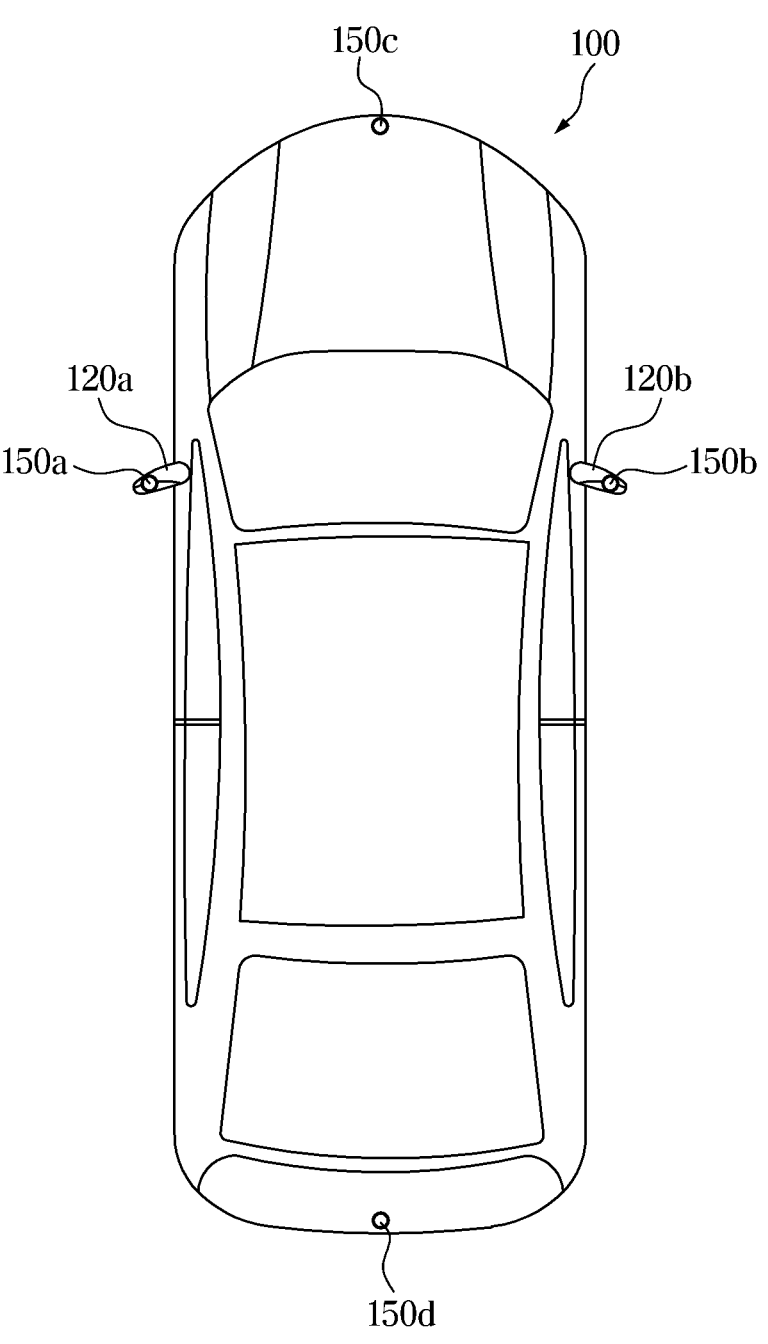
FIG. 5 is a view illustrating surround cameras disposed in the vehicle according to an embodiment.

FIG. 5 is a view illustrating surround cameras 150 located on the vehicle according to an embodiment.

Referring to FIG. 5, surround view cameras 150 (150*a*, 150*b*, 150*c*, and 150*d*) may be installed on a front bumper and a rear bumper of the vehicle 100, respectively, in order to secure a field of views facing left and right sides (or lower left and right sides) of the vehicle 100 and secure a field of views facing the side mirrors 120 of the vehicle 100 and front and rear directions (or lower front and rear sides) of the vehicle 100.

The surround view cameras 150 may capture the left and right sides (or lower left and right portions) and front and rear (or lower front and rear portions) of the vehicle 100, and obtain image data of the left and right sides (or lower left and right sides) and the front and rear (or lower front and rear sides) of the vehicle 100, respectively. These image data may be used to create a surround view image of the vehicle 100. The surround view image may be also referred to as a top view image or a bird's eye view image.

FIG. 6 is a control block diagram of the vehicle according to an embodiment.

Referring to FIG. 6, the vehicle 100 may include a controller 160 configured to perform overall control.

The communicator 140, the surround view cameras 150, the first side mirror 120*a*, and the second side mirror 120*b* are electrically connected to the controller 160.

The controller 160 may include at least one processor 161 and memory 162.

The memory 162 may store information related to a distance, such as the reference distance, and may store information related to remote controller authentication, such as identification information and authentication information of the remote controller 200.

The memory 162 may store identification information and position information of the LF antennas 141*a* to 141*e*, and may store distance information between the respective LF antennas.

For example, in an embodiment, the memory 162 may be implemented as a non-volatile memory device such as a cache, a read only memory (ROM), a programmable ROM (PROM), an erasable programmable ROM (EPROM), an electrically erasable programmable ROM (EEPROM), a flash memory, a volatile memory device such as a RAM (random access memory), a storage medium such as a hard disk drive (HDD), a CD-ROM, and any combinations thereof, but is not necessarily limited thereto.

The memory 162 may be a memory implemented as a separate chip from the processor described above with respect to the processor 161, or may be implemented as a single chip with the processor 161.

The controller 160 may fold or unfold the first side mirror 120*a* provided on the outside of the driver seat door and the second side mirror 120*b* provided on the outside of the front passenger door. The controller 160 may operate the adjusting member 122 of the corresponding side mirror (120*a* or 120*b*) to rotationally move the housing of the corresponding side mirror, thereby folding or unfolding the corresponding side mirror.

The controller 160 having the above configuration may determine whether the vehicle 100 is in an ignition-on state or an ignition-off state. The controller 160 may determine that the vehicle 100 is in the parked state when it is determined that the vehicle 100 is in the ignition-off state.

The controller 160 may determine whether the driver has gotten off the vehicle 100 in the ignition-off state. The controller 160 may determine whether the driver is present outside or inside the vehicle 100 through communication with the remote controller 200, and determine that the driver has gotten off the vehicle 100 when it is determined that the driver is present outside the vehicle 100.

The controller 160 may determine whether the vehicle 100 is in the driving or parked state based on gear shift information, ignition on/off information and driving information of the vehicle 100, and driver getting on and off information.

The controller 160 may fold the side mirrors 120 when it is determined that the vehicle 100 is in the parked state. The controller 160 may fold the side mirrors 120 when the vehicle 100 is in the parking state and a distance between the driver that has gotten off of the vehicle 100 exceeds a preset distance.

The controller 160 may wirelessly communicate with the remote controller 200 through the communicator 140.

The controller 160 may attempt a communication connection with the remote controller 200 by transmitting an LF signal to the remote controller 200 when the vehicle 100 is in the parked state, obtain information on a distance to the remote controller 200 based on an intensity of the RF response signal transmitted from the remote controller 200 in response to the LF signal when the communication connection with the remote controller 200 is possible, and determine a distance to the driver based on the information on the distance to the remote controller 200.

The controller 160 may attempt the communication connection with the remote controller 200 when the vehicle 100 is in the parked state, check a ranking of communication connection with the remote controller 200 for the LF antennas 141a to 141e when the communication connection with the remote controller 200 is possible, check the LF antenna having the fastest communication connection ranking, obtain direction information with the remote controller 200 based on a position of the checked LF antenna, and determine a direction of the driver based on the information on the distance to the remote controller 200.

The controller 160 may determine the location of the driver based on the distance to the driver and the direction of the driver.

The controller 160 may also obtain a walking path of the driver based on a change in communication connection with the remote controller 200 for the LF antennas 141a to 141e.

The controller 160 may create a surround view image of the vehicle 100 based on the image data of the left and right sides (or lower left and right sides) and the front and rear (or lower front and rear sides) of the vehicle 100 obtained through the surround view cameras 150.

The controller 160 may detect motions of the driver and/or a passenger in front, rear, left, and right positions of the vehicle 100 based on a change of a plurality of areas of the surround view image of the vehicle 100.

The controller 160 may execute the welcome mirror function to unfold the folded side mirrors 120a and 120b in a case in which the driver approaches the parked vehicle 100 when the vehicle 100 is in the parked state. At this time, the controller 160 may appropriately control the folding/unfolding of the side mirrors 120a and 120b based on the location of the driver or the locations of the driver and passenger to prevent interference between the side mirrors 120a and 120b, which are unfolded by the welcome mirror function, and the driver, or interference between the side mirrors 120a and 120b, which are unfolded by the welcome mirror function, and the passenger.

Hereinafter, for convenience of description, a state in which an execution condition of the welcome mirror function is satisfied when the remote controller 200 approaches the vehicle 100 by the reference distance d or less is referred to as a state in which the approach of the driver is detected.

Figure 7:
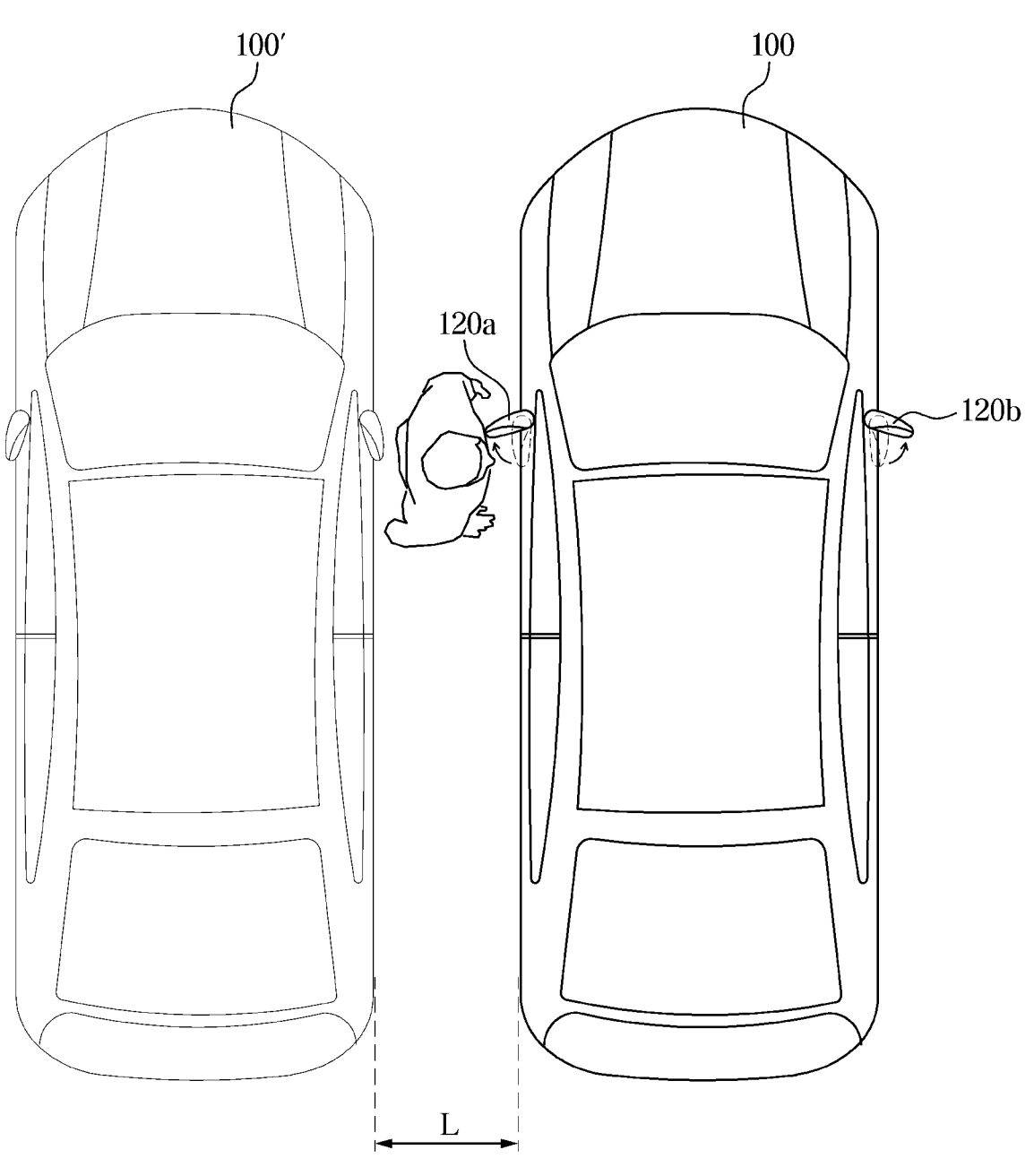
FIG. 7 is a view for explaining interference that may occur between the side mirror unfolded by a welcome mirror function and a driver when the driver approaches the vehicle.

FIG. 7 is a view for explaining interference that may occur between the side mirror unfolded by the welcome mirror function and the driver when the driver approaches the vehicle.

Referring to FIG. 7, in a case in which the welcome mirror function is executed when the driver passes the side mirror 120a on the driver seat side in order to move to the driver seat to get into the vehicle 100, interference that hinders the progress of the driver may occur as the folded side mirror 120a is unfolded.

When another vehicle 100' is parked side by side on the driver seat side of the vehicle 100, the driver needs to proceed to the driver seat between the vehicles in order to get into the vehicle 100. At this time, the welcome mirror function executed by approach of the driver is activated, so that the folded side mirror 120a is unfolded. When the folded side mirror 120a is unfolded while the driver has not yet passed the side mirror 120a, clothes of the driver may be contaminated when the unfolded side mirror 120a interferes with the progress of the driver and comes into contact with the driver. That is, when an interval L with the other vehicle

100' parked right next to the vehicle 100 is narrow enough for the driver to barely pass, the driver may not be able to get close to the driver seat due to the interference of the side mirror 120a that is unfolded when the driver passes the side mirror 120a of the vehicle 100, or may feel uncomfortable or the side mirror 120a may be damaged by the driver coming into contact with the unfolded side mirror 120a.

In an embodiment, by appropriately controlling the folding/unfolding of the side mirrors 120a and 120b based on the location of the driver or the locations of the driver and passenger(s), interference between the side mirrors 120a and 120b, which are unfolded by the welcome mirror function, and the driver, and/or interference between the side mirrors 120a and 120b, which are unfolded by the welcome mirror function, and the passenger(s) may be prevented.

Figure 8:
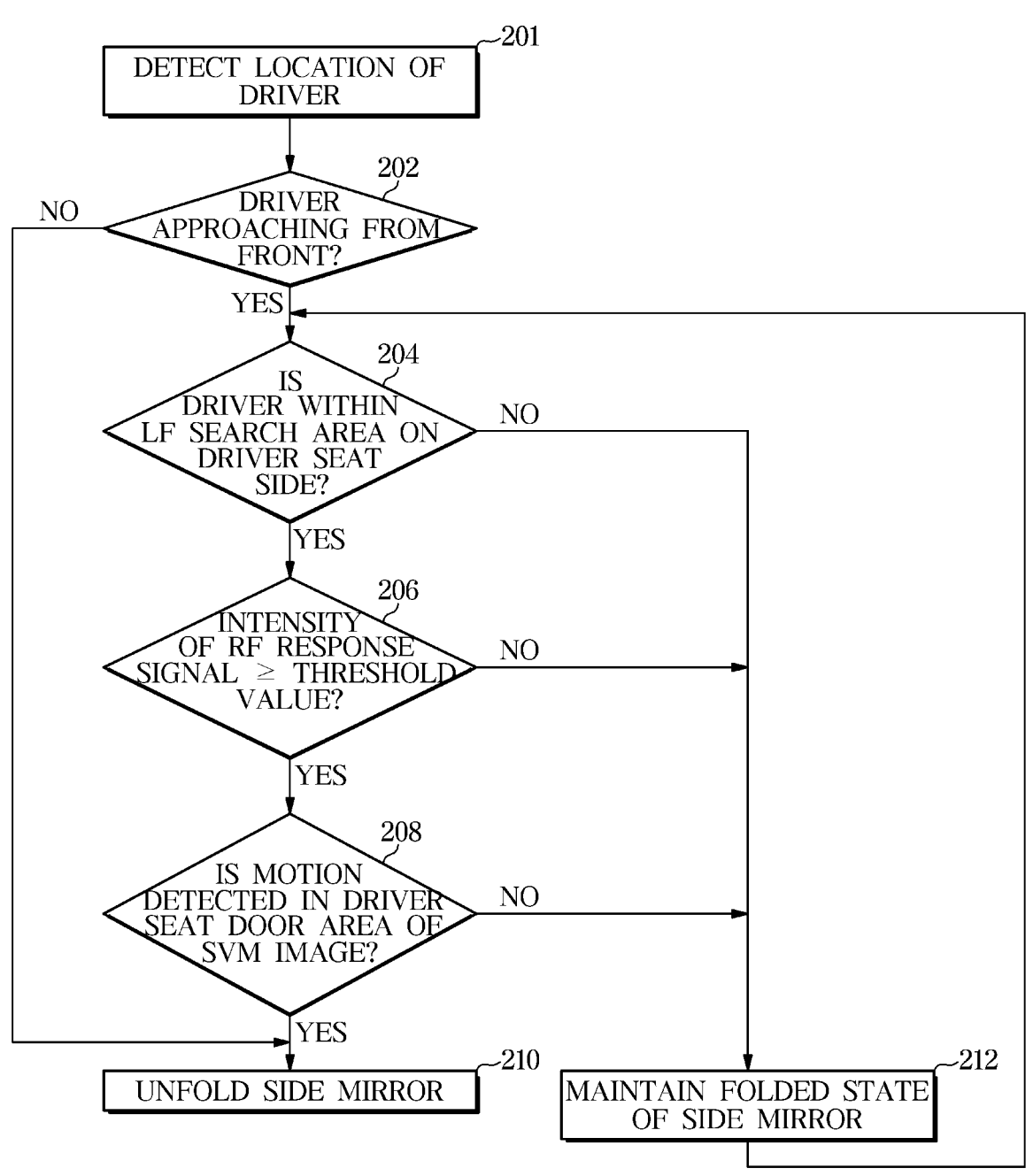
FIG. 8 is a flowchart of a vehicle control method according to an embodiment.

FIG. 8 is a flowchart of a vehicle control method according to an embodiment.

Referring to FIG. 8, the vehicle 100 may detect the location of the driver carrying the remote controller 200 by wirelessly communicating with the remote controller 200 (action 201).

The vehicle 100 may determine whether the driver is approaching from the front of the vehicle 100 based on the location of the driver (decision 202).

When the driver approaches from the front of the vehicle 100 (YES in decision 202), the vehicle 100 may determine whether the location of the driver is within a search area of the LF antenna 141a provided on the door handle of the driver seat side (decision 204).

When the location of the driver is within the search area of the LF antenna 141a (YES in decision 204), the vehicle 100 may determine whether the intensity of the RF response signal is greater than or equal to a preset threshold value (decision 206).

When the intensity of the RF response signal is the preset threshold value (YES in decision 206), the vehicle 100 may determine whether a motion is detected in a driver seat door area (pixel area ② 320 in FIG. 10) of the surround view image (SVM image) (decision 208).

Figure 9:
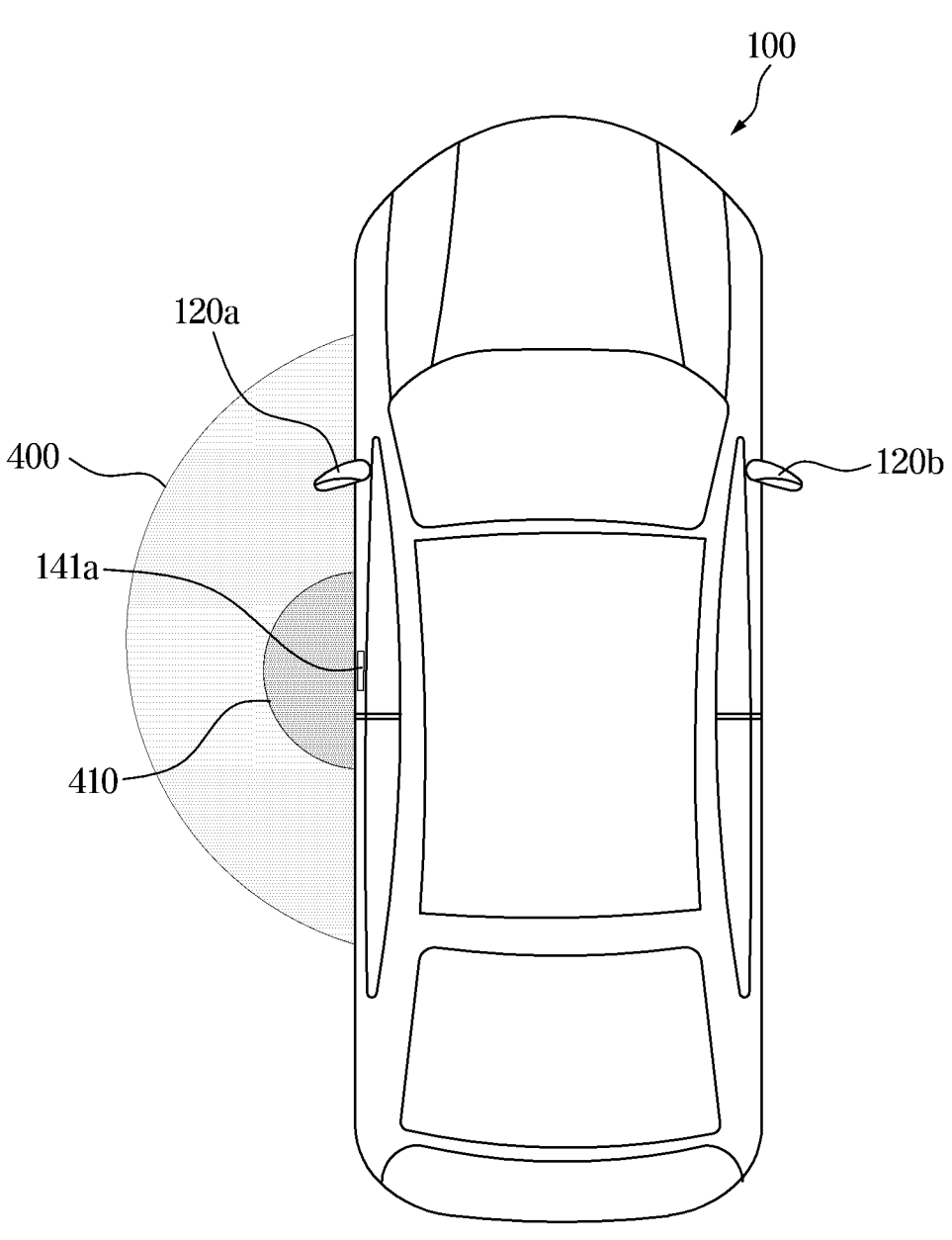
FIG. 9 is a view illustrating a search area of a LF antenna provided on a door handle of a driver seat side of the vehicle according to an embodiment.

FIG. 9 is a view illustrating a search area 400 of a LF antenna provided on the door handle of the driver seat side of the vehicle according to an embodiment.

Referring to FIG. 9, a LF search area 400 of the LF antenna 141a provided on the door handle of the driver seat side is shown. The LF search may be a search of a LF communication method.

The LF search area 400 may be a LF communication area formed around the LF antenna 141a provided on the door handle of the driver seat side.

The controller 160 may determine whether the driver carrying the remote controller 200 is located within the LF search area 400 of the LF antenna 141a provided on the door handle of the driver seat side.

The controller 160 may detect the location of the driver carrying the remote controller 200 using the intensity of the RF response signal transmitted by the remote controller 200 in response to the LF search signal within the search area of the LF antenna 141a provided on the door handle of the driver seat side.

The controller 160 may detect the intensity of the RF response signal transmitted from the remote controller 200, and determine that the remote controller 200 is located within the LF search area 400 when the intensity of the detected RF response signal is greater than or equal to an intensity of the LF antenna 141a corresponding to the LF search area 400.

A driver seat access area 410, which is an area within the LF search area 400 on the door handle of the driver seat side, is an area for determining whether the driver approaches (or arrives at) the driver seat.

The driver seat access area 410 may be an area in which the intensity of the RF response signal transmitted from the remote controller 200 is greater than or equal to the threshold value, for example.

When the intensity of the RF response signal transmitted from the remote controller 200 within the LF search area 400 on the door handle of the driver seat side is greater than the threshold value, the controller 160 may determine that the driver carrying the remote controller 200 has approached the driver seat.

Figure 10:
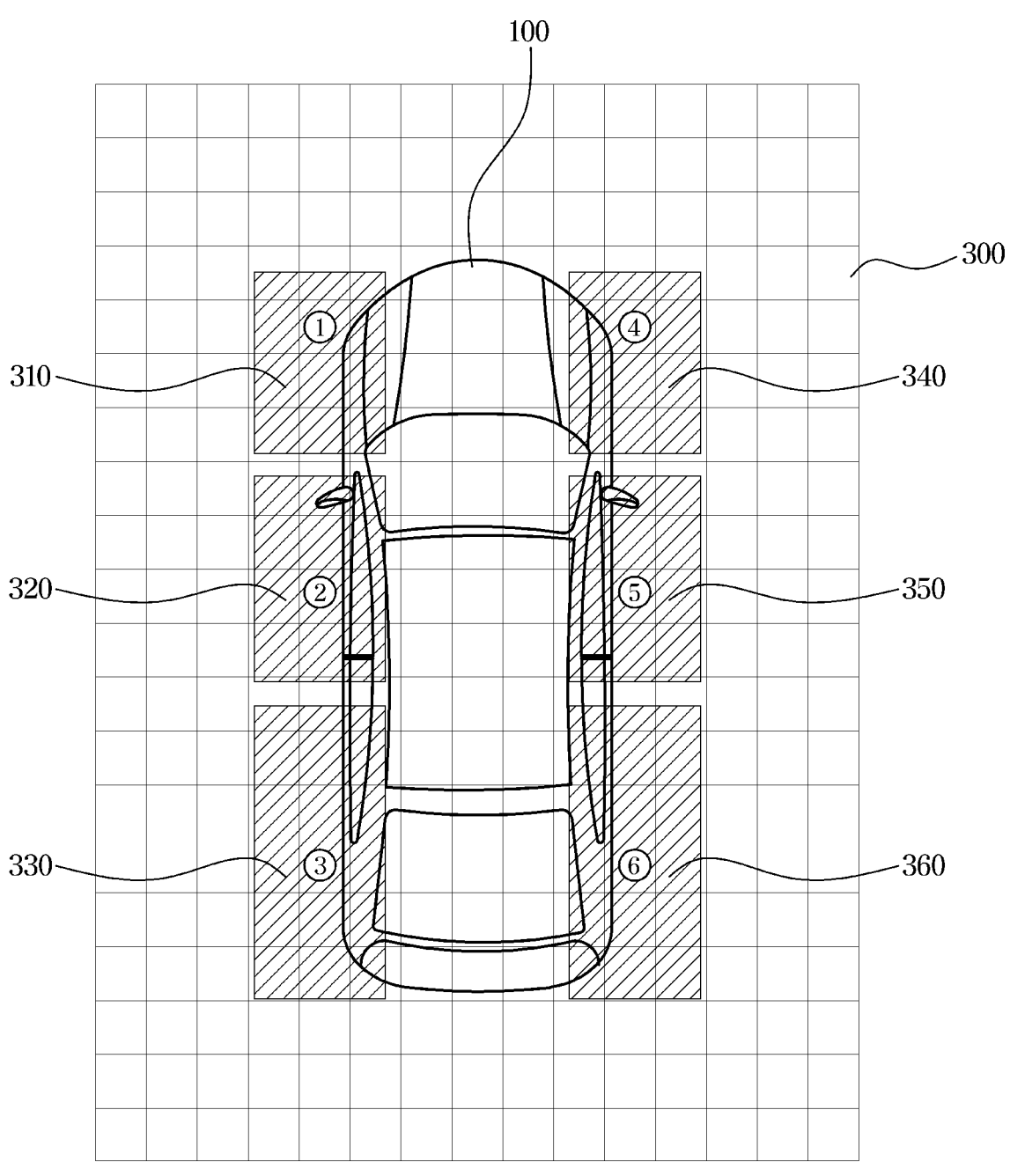
FIG. 10 is a view illustrating a surround view image of the vehicle according to an embodiment.

FIG. 10 is a view illustrating a surround view image 300 of the vehicle 100 according to an embodiment.

Referring to FIG. 10, the controller 160 may create a surround view image 300 of the vehicle 100 based on the image data of the left and right sides (or lower left and right sides) and the front and rear (or lower front and rear sides) of the vehicle 100 obtained through the surround view cameras 150. In addition, a surround view monitor (SVM) system is installed, which uses the surround view cameras 150 to display a situation around the vehicle as an image 300, the vehicle 100 may receive a surround view image 300 from the SVM system. The SVM system, which may be a parking assistance system that displays a situation around the vehicle as an image, expands a field of view of the driver to 360 degrees by creating SVM images of parking lines, blind areas, obstacles, etc., with a view looking down at the surroundings of the vehicle from the sky and displaying the SVM images on an in-vehicle monitor.

The controller 160 may divide a surround view image 300 of the vehicle 100 into a plurality of areas 310, 320, 330, 340, 350, and 360, and perform a motion sensing control in the corresponding area based on a change in pixel values of each of the areas 310, 320, 330, 340, 350, and 360. The controller 160 divides pixel areas from the left and right side mirrors 120a and 120b as starting points in the surround view image 300 of the vehicle 100 and performs motion sensing for each pixel area or in at least one of the pixel areas.

The plurality of areas 310, 320, 330, 340, 350, and 360 may include a driver seat front fender area 310 (pixel area ①), a driver seat door area 320 (pixel area ②), a driver seat rear fender (back fender) area 330 (pixel area ③), a front passenger seat front fender area 340 (pixel area ④), a front passenger seat door area 350 (pixel area ⑤), and a rear passenger seat rear fender area 360 (pixel area ⑥), respectively.

The driver seat front fender area 310 (pixel area ①) and the driver seat door area 320 (pixel area ②) may be divided based on the first side mirror 120a, which is a driver seat side mirror. The driver seat front fender area 310 (pixel area ①) may be an area formed in front of the first side mirror 120a, and the driver seat door area 320 (pixel area ②) may be an area formed in the rear of the first side mirror 120a, for example.

Similarly, the front passenger seat front fender area 340 (pixel area ④) and the front passenger seat door area 350 (pixel area ⑤) may be divided based on the second side mirror 120b, which is a front passenger seat side mirror. The front passenger seat front fender area 340 (pixel area ④) may be an area formed in front of the second side mirror 120b, and the front passenger seat door area 350 (pixel area ⑤) may be an area formed in the rear of the second side mirror 120b, for example.

The controller 160 may determine whether a motion is detected in each pixel area through image processing of each of the pixel areas ①, ②, ③, ④, ⑤, and ⑥.

For example, the controller 160 may convert the surround view image 300 extracted every predetermined time (e.g., 0.5 seconds) into a gray scale image and then overlaps the front and back images input every time, and may compare data (for example, contour values, color values, etc.) of the pixel areas ①, ②, ③, ④, 5, and ⑥, respectively. As a result of the comparison, when a data difference in the corresponding pixel area is greater than or equal to a preset threshold value (e.g., 20% of the corresponding pixel area), the controller 160 may estimate that a motion is detected in the corresponding pixel area, for example.

Referring again to FIG. 8, when a motion is detected in the driver seat door area 320 (pixel area ② in FIG. 10) of the surround view image (SVM image 300) (YES in decision 208), the vehicle 100 may unfold the folded side mirrors 120a and 120b (action 210).

Referring still to FIG. 8, when the driver is not approaching from the front of the vehicle 100 (NO in decision 202), the vehicle 100 may unfold the folded side mirrors 120a and 120b by determining that the driver is approaching from the rear of the vehicle 100 (action 210).

Referring still to FIG. 8, when the driver is not located within the search area of the LF antenna 141a (NO in decision 204), the vehicle 100 may maintain the folded state of the side mirrors 120a and 120b (action 212).

Referring still to FIG. 8, when the intensity of the RF response signal is not greater than or equal to the threshold value (NO in decision 206), the vehicle 100 may maintain the folded state of the side mirrors 120a and 120b (action 212).

Referring still to FIG. 8, when a motion is not detected in the driver seat door area 320 (pixel area ② 320 in FIG. 10) of the surround view image (SVM image 300) (NO in decision 208), the vehicle 100 may maintain the folded state of the side mirrors 120a and 120b (action 212).

Figure 11:
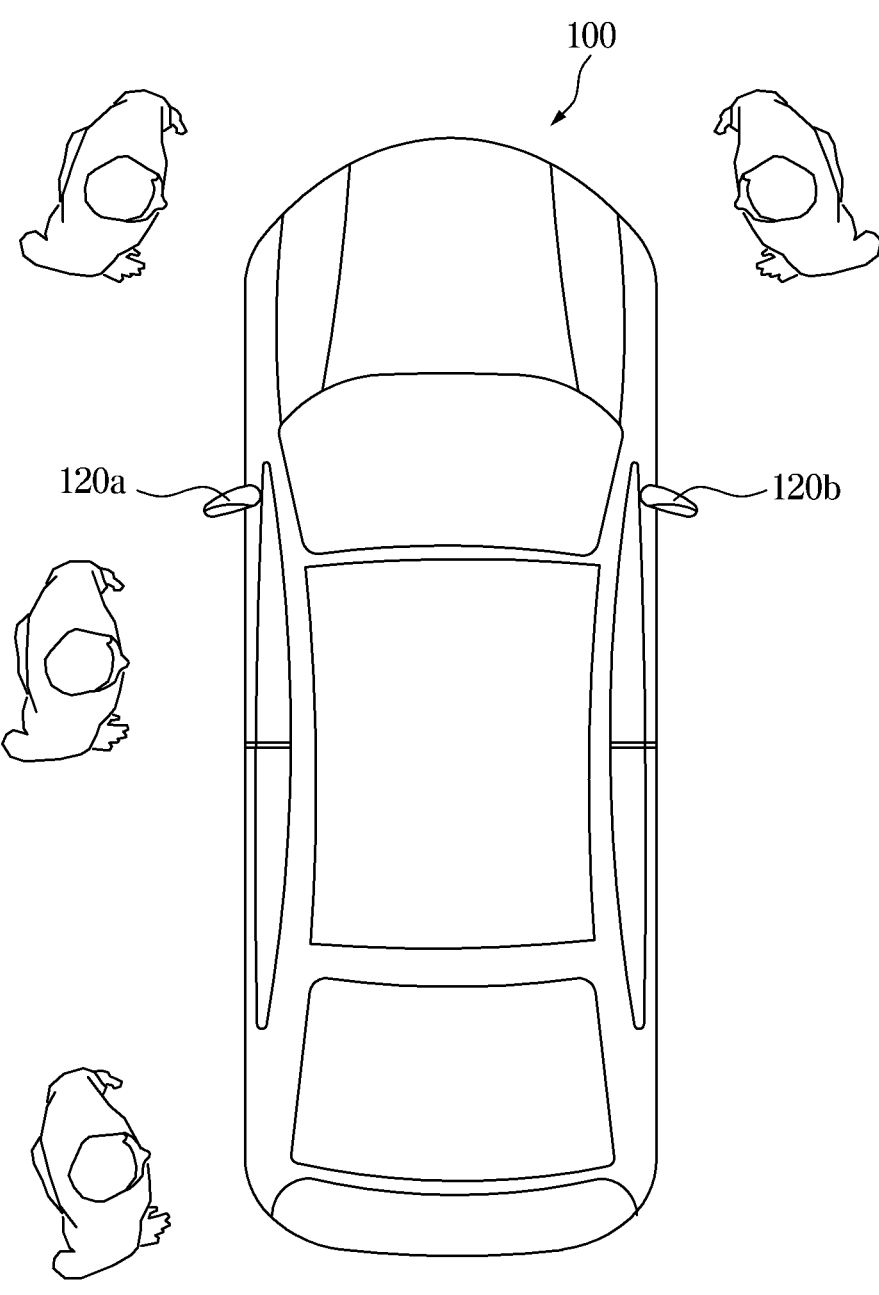
FIG. 11 is a view illustrating detection of an approaching direction and location of the driver carrying the remote controller from the vehicle according to an embodiment.

FIG. 11 is a view illustrating detection of an approaching direction and location of a driver (various example driver positions shown, for examples) carrying the remote controller 200 relative to the vehicle 100 according to an embodiment.

Referring to FIG. 11, when the vehicle 100 is in the parked state, the vehicle 100 may identify the approaching direction and location of the driver approaching the vehicle 100.

The vehicle 100 may identify the approaching direction and location of the driver approaching the vehicle 100 based on the intensity of the RF response signal of the remote controller 200 carried by the driver, the mounting position of the LF antennas 141a to 141e receiving the RF response signal, and pixel changes in the plurality of areas of the surround view image 300, for example.

FIGS. 12 to 19 are views illustrating folding/unfolding operations of the side mirrors based on various scenarios in which the driver approaches the vehicle according to an embodiment. The driver may be defined/classified as the person having the remote controller 200 in a given scenario, for example.

FIGS. 12 to 19 illustrate example scenarios in which the vehicle 100 is parked in a state in which the vehicle 100 and the other vehicle 100' are narrow enough for the driver or passenger to barely pass.

The vehicle 100 may also or alternatively recognize whether or not the vehicle 100 is in a narrowly parked state through the surround view image 300 (e.g., 310 and/or 320 and/or 330) or through an obstacle detection sensor such as a radar and an ultrasonic sensor installed on the vehicle 100.

Figure 12:
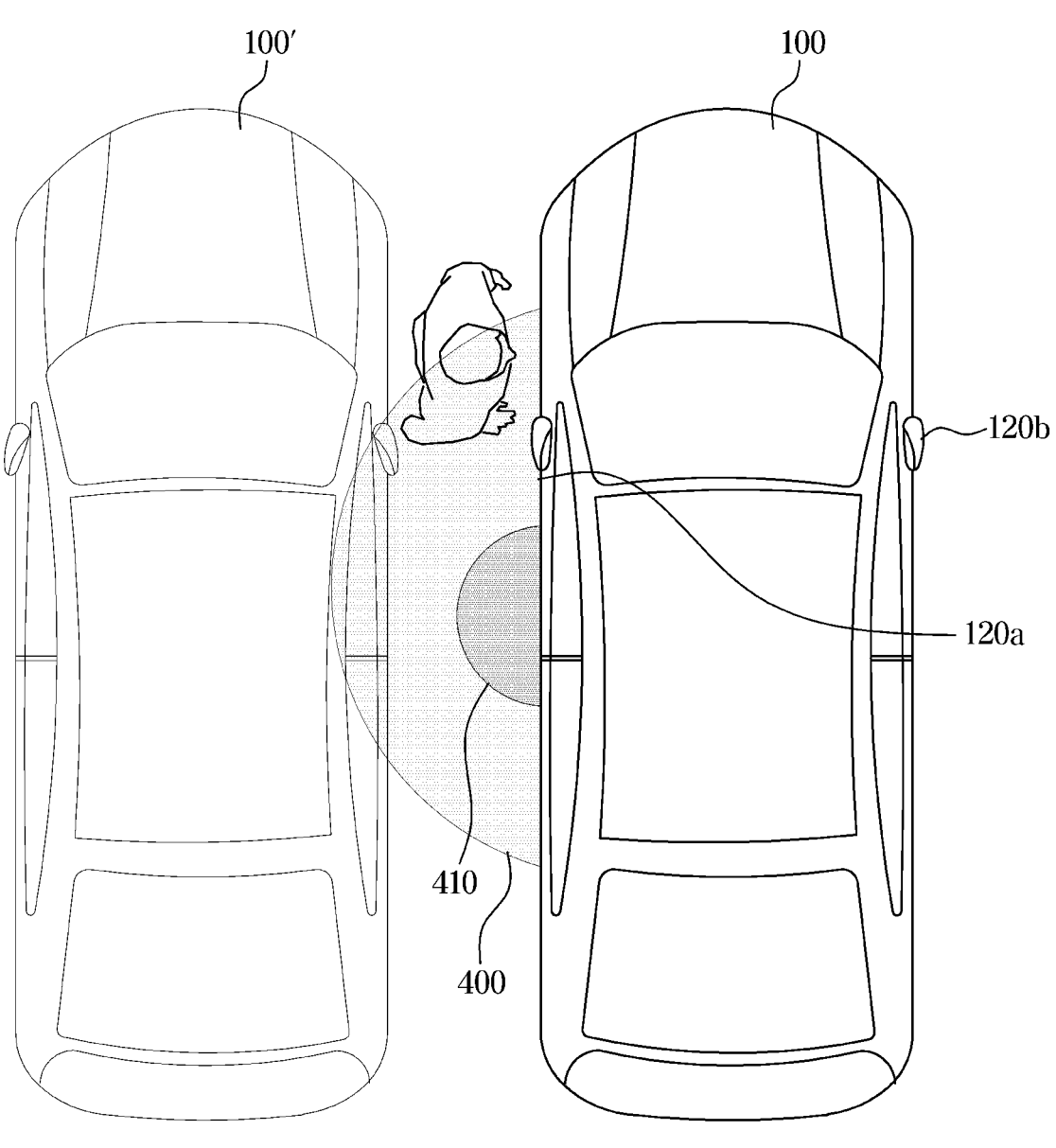
FIGS. 12 to 19 are views illustrating folding/unfolding operations of the side mirrors based on various scenarios in which the driver approaches the vehicle according to an embodiment.
Figure 13:
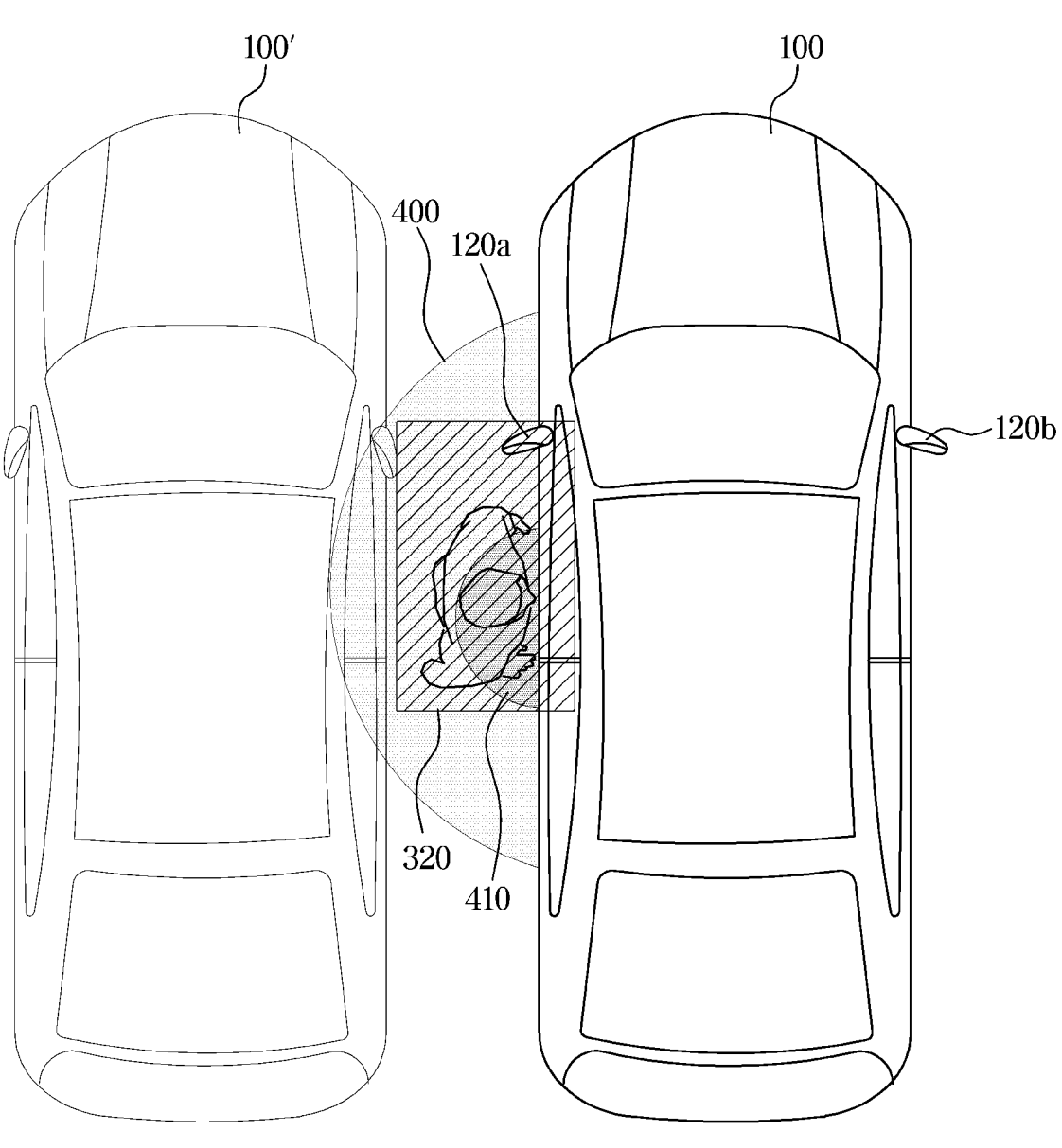

FIGS. 12 and 13 illustrate an example scenario (sequence from FIG. 12 to FIG. 13) in which the driver approaching from the front in the direction of the driver seat is detected.

Referring to FIG. 12, the vehicle 100 does not immediately unfold the side mirrors 120*a* and 120*b* when the approach of the driver from the front is detected.

The vehicle 100 may determine whether the driver is present within the LF search area 400 on the door handle of the driver seat side and the intensity of the RF response signal transmitted from the remote controller 200 is less than the threshold value.

When the driver is present within the LF search area 400 on the door handle of the driver seat side and the intensity of the RF response signal transmitted from the remote controller 200 is less than the threshold value, the vehicle 100 may maintain the folded state of the side mirrors 120*a* and 120*b* so that the driver does not interfere with the side mirrors 120*a* by determining that the driver approaching from the front is located before passing the side mirror 120*a*. At this time, the vehicle 100 may maintain the folded state of the side mirrors 120*a* and 120*b* even when the passenger and other movements are detected in a rear seat area of the surround view image, for example.

Referring to FIG. 13, when the driver is present within the LF search area 400 on the door handle of the driver seat side, the intensity of the RF response signal transmitted from the remote controller 200 is greater than the threshold value, and a motion is detected in the driver seat door area 320 (pixel area ②) of the surround view image, the vehicle 100 may unfold the folded side mirrors 120*a* and 120*b* by determining that the driver approaching from the front is located after passing the side mirror 120*a*. At this time, the vehicle 100 may unfold the side mirrors 120*a* even when the passenger and other movements are detected in the rear seat area of the surround view image, for example.

On the other hand, when the driver is present within the LF search area 400 on the door handle of the driver seat side and the intensity of the RF response signal transmitted from the remote controller 200 is greater than the threshold value, the vehicle 100 may unfold the folded side mirrors 120*a* and 120*b* by determining that the driver approaching from the front is located after passing the side mirror 120*a*, for example.

Figure 14:
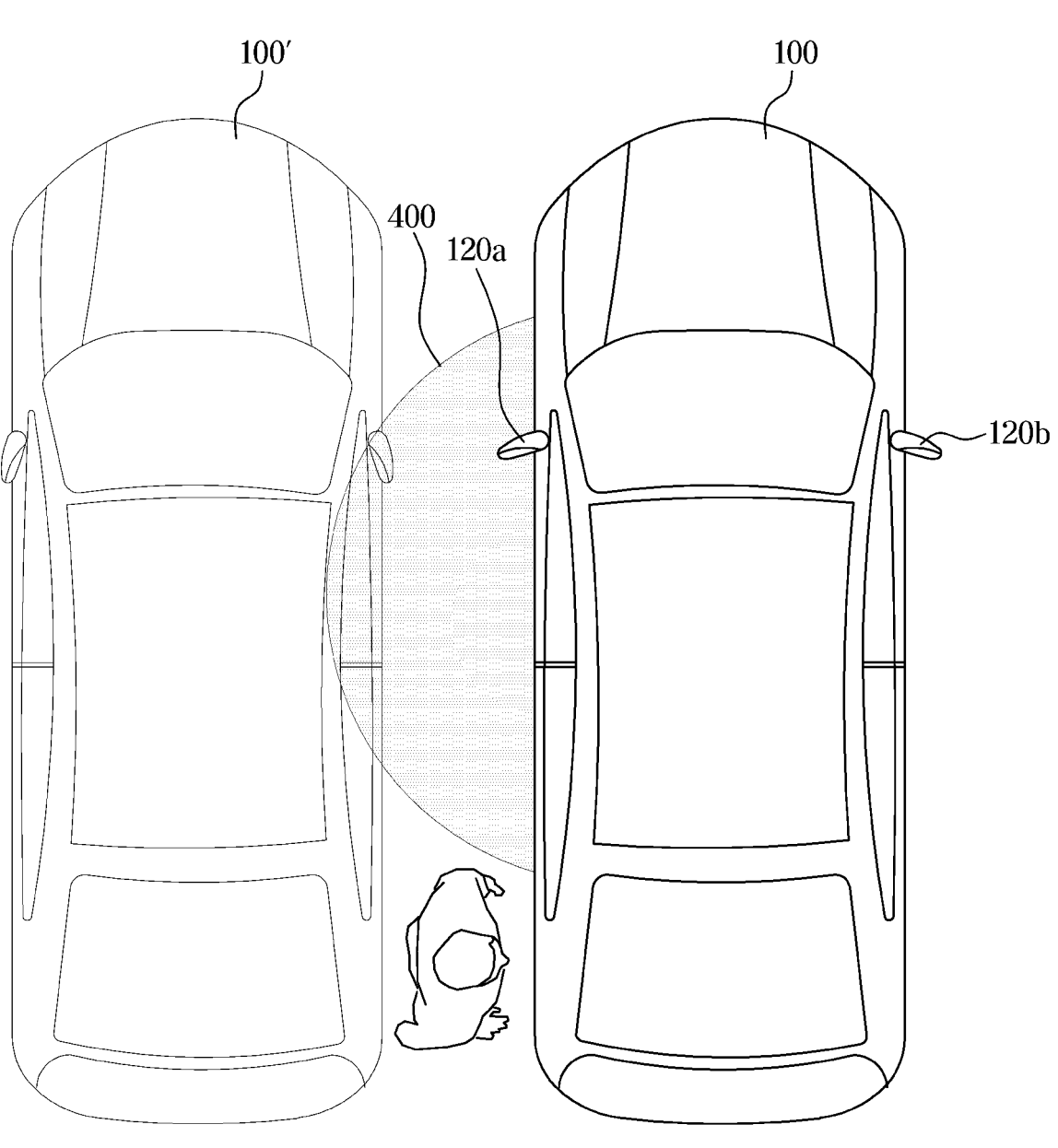

FIG. 14 illustrates an example scenario in which the driver approaching from the rear is detected.

Referring to FIG. 14, when the driver approaching from the rear is detected, because interference between the driver and the side mirrors 120*a* and 120*b* does not occur, the vehicle 100 may immediately unfold the folded side mirrors 120*a* and 120*b*.

Figure 15:
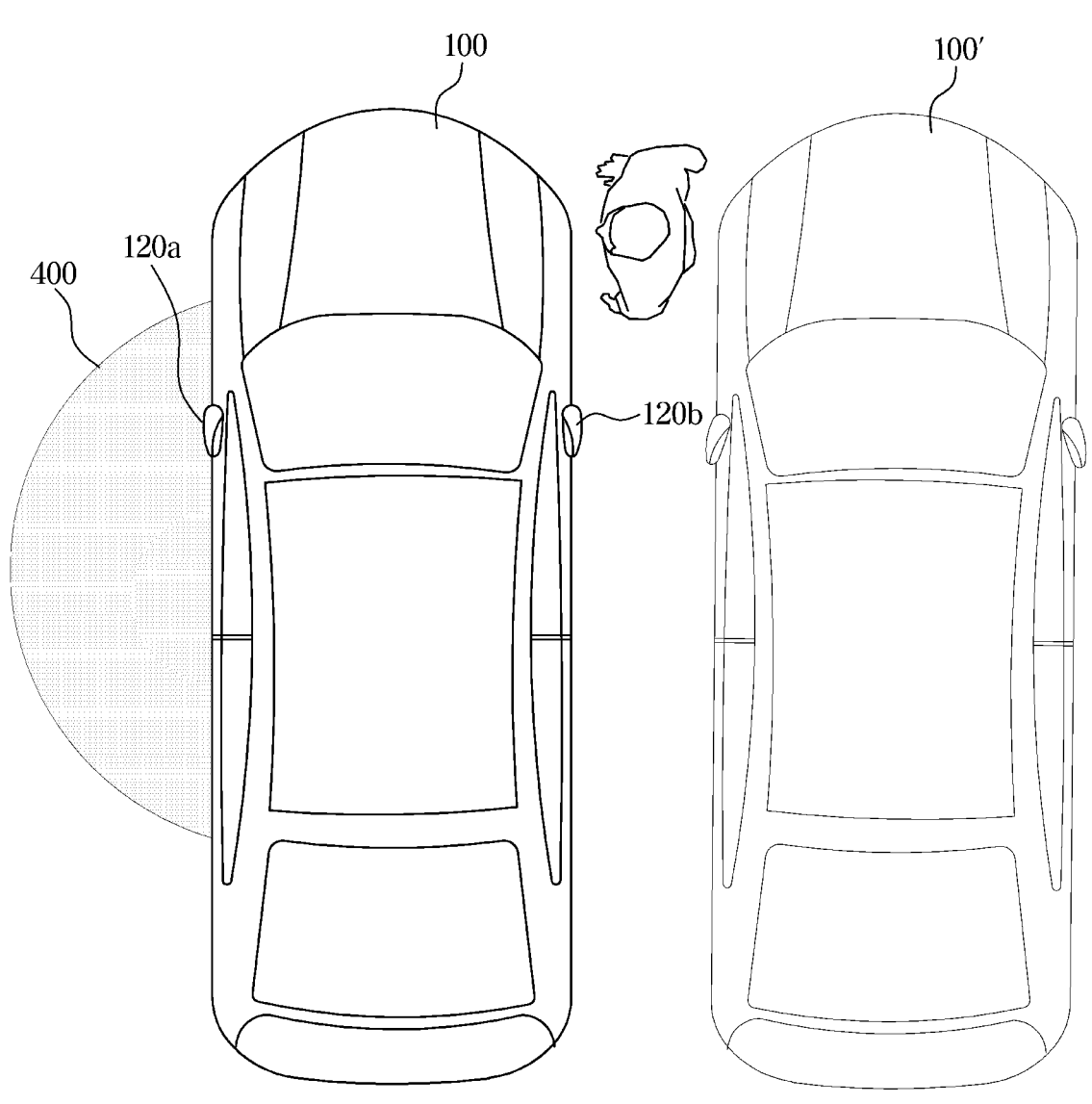

FIG. 15 illustrates an example scenario in which the driver approaching from the front in the direction of the front passenger seat is detected.

Referring to FIG. 15, when the driver is not present within the LF search area 400 on the door handle of the driver seat side, the vehicle 100 may maintain the folded state of the side mirrors 120*a* and 120*b* so that interference between the driver and the side mirrors 120*b* of the front passenger seat side does not occur.

Figure 16:
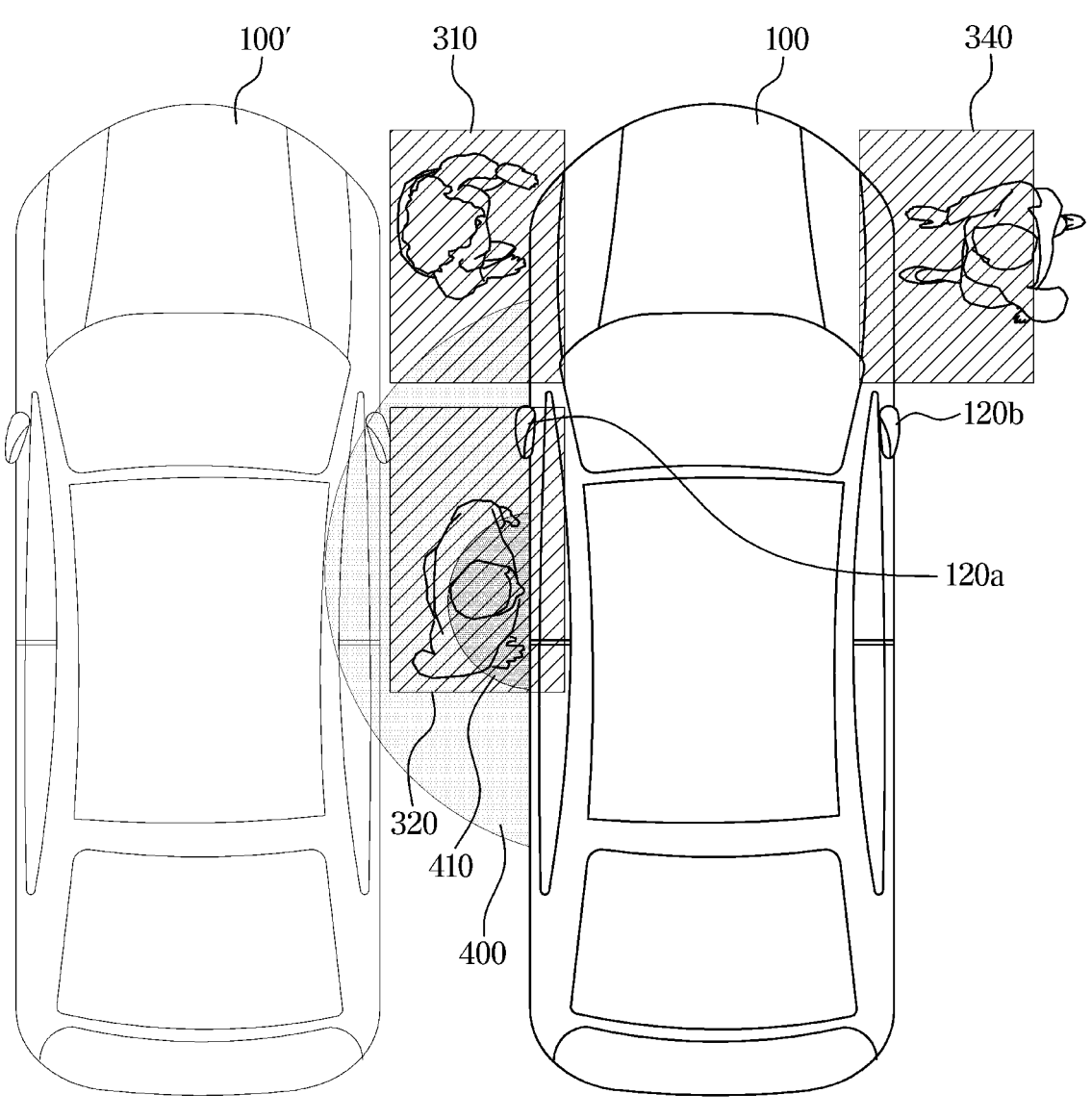
Figure 17:
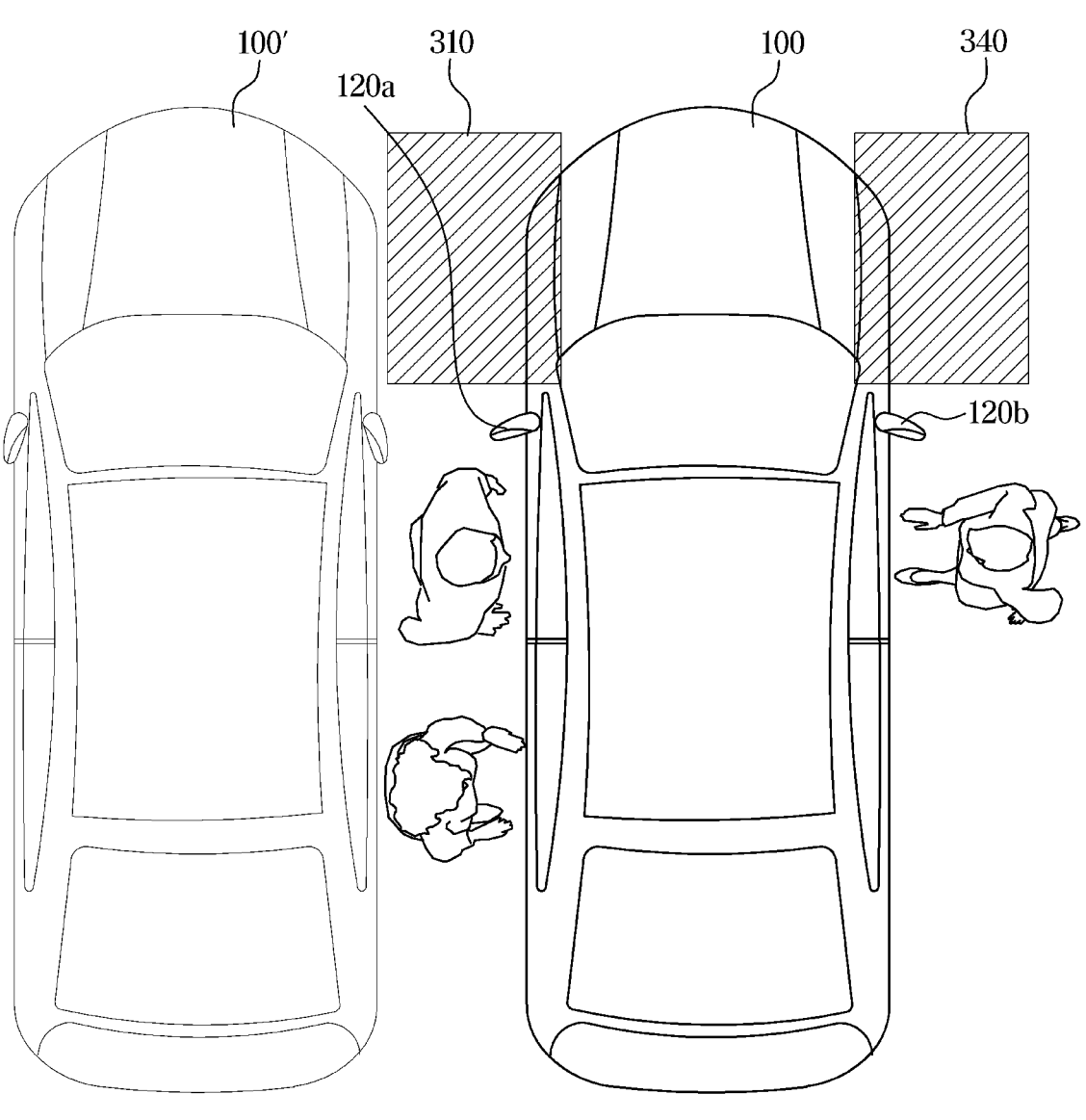

FIGS. 16 and 17 illustrate an example scenario in which the driver approaching vehicle 100 together with passengers is detected.

Referring to FIG. 16, when the driver is present within the LF search area 400 on the door handle of the driver seat side, the intensity of the RF response signal transmitted from the remote controller 200 is greater than the threshold value, a motion is detected in the driver seat door area 320 (pixel area ②) of the surround view image, and a motion is detected in the driver seat front fender area 310 (pixel area ①) and/or the front passenger seat front fender area 340 (pixel area ④) of the surround view image, the vehicle 100 may maintain the folded state of the side mirrors 120*a* and 120*b* so that passengers do not interfere with the side mirrors 120*a* and 120*b* by determining that the driver has passed the side mirror 120*a* of the driver seat but the passengers have not yet passed the side mirrors 120*a* and 120*b*, for example.

Referring to FIG. 17, in the different state than FIG. 16, when motions are not detected in the driver seat front fender area 310 (pixel area ①) and the front passenger seat front fender area 340 (pixel area ④) of the surround view image, the vehicle 100 may unfold the folded side mirrors 120*a* and 120*b* by determining that the passengers have also passed the side mirrors 120*a* and 120*b*, for example.

Figure 18:
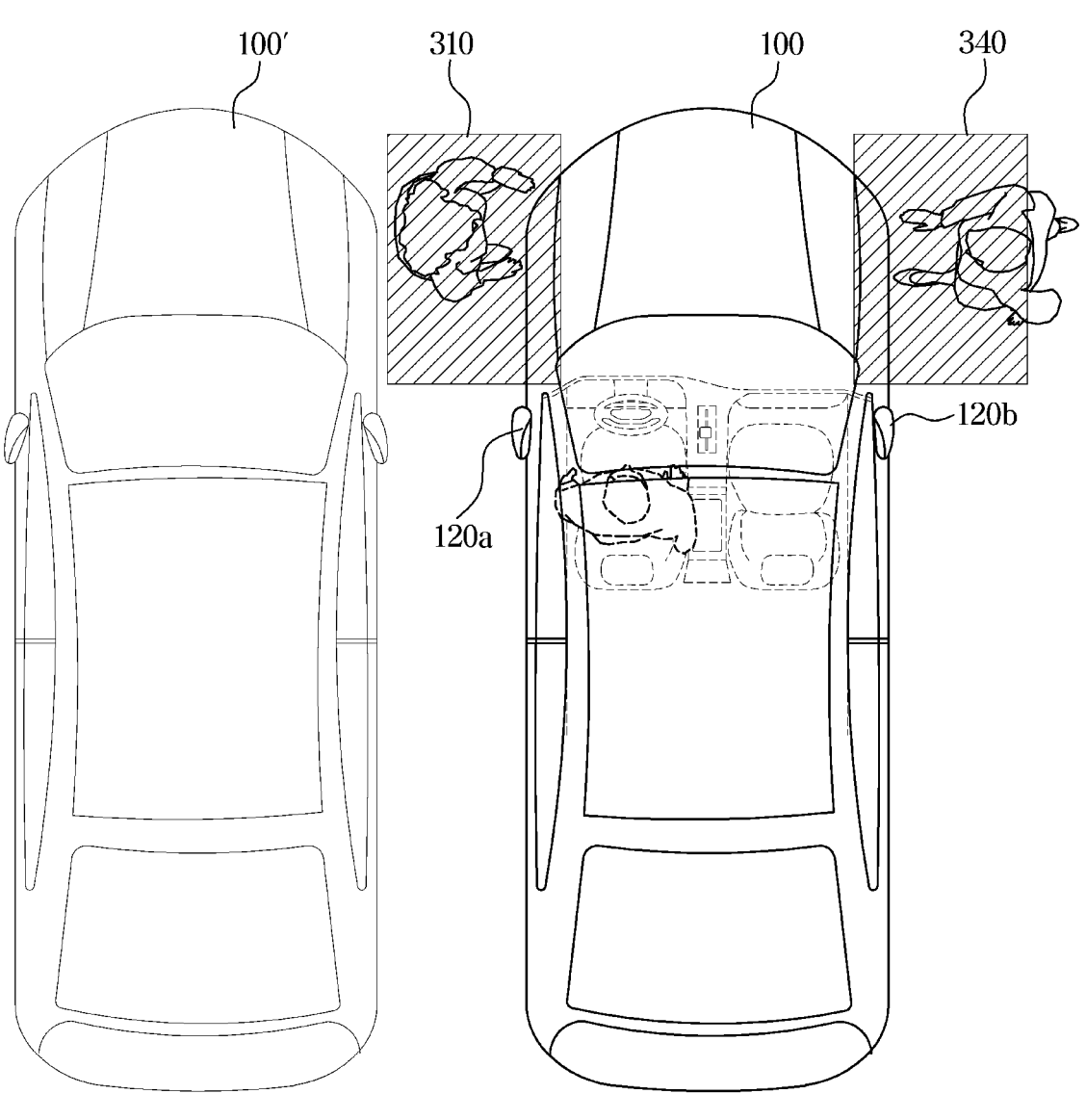
Figure 19:
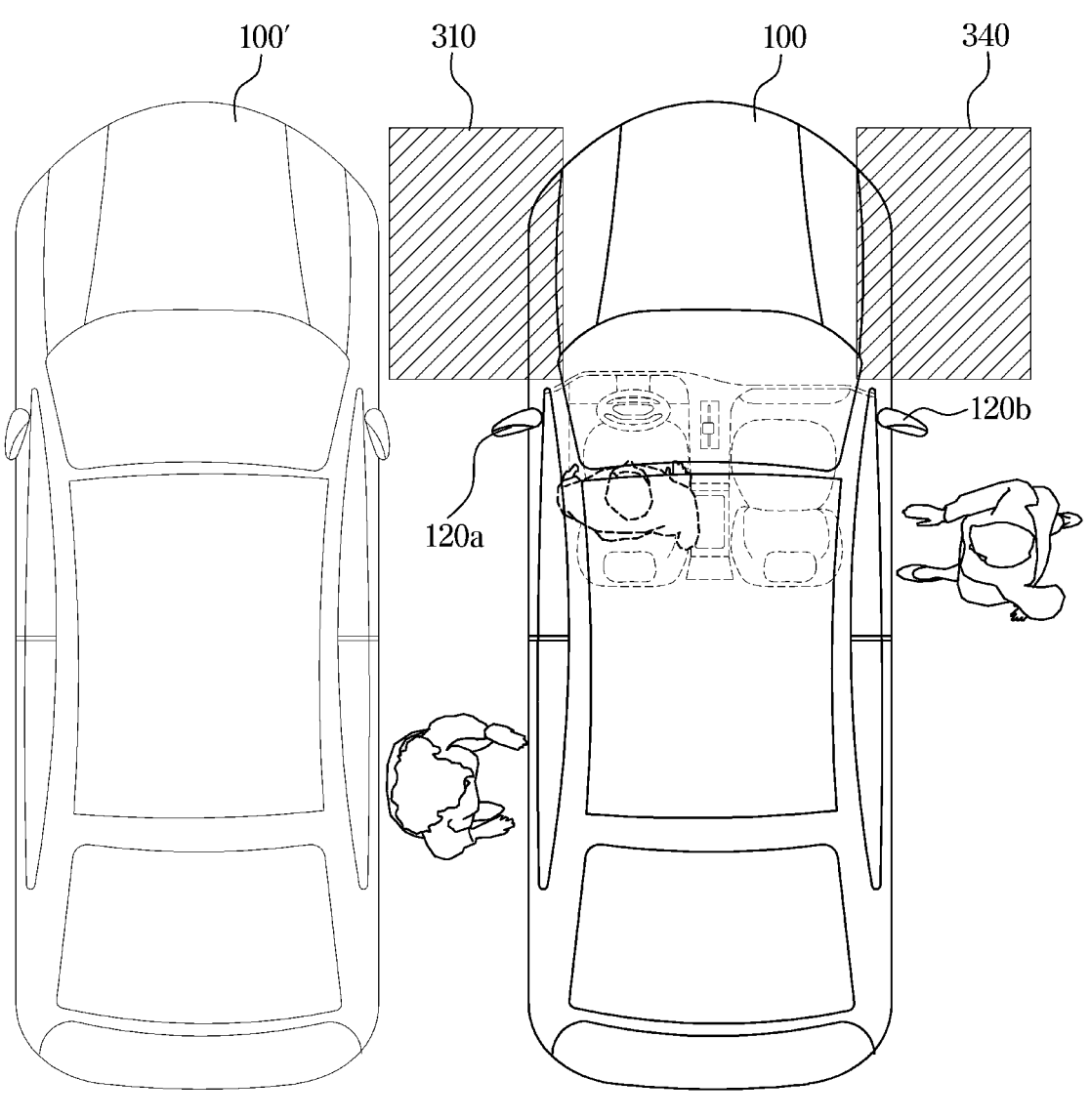

FIGS. 18 and 19 illustrate an example scenario in which passengers approach from the front in a state in which the driver enters the vehicle 100 and sits in the driver seat.

Referring to FIG. 18, when the driver is present inside the vehicle 100 and a motion is detected in the driver seat front fender area 310 (pixel area ①) and/or the front passenger seat front fender area 340 (pixel area ④) of the surround view image, the vehicle 100 may fold the unfolded side mirrors 120*a* and 120*b* by determining that passengers to board the vehicle are present and that the passengers have not yet passed the side mirrors 120*a* and 120*b*, for example.

Referring to FIG. 19, in a different state than FIG. 18, when motions are not detected in the driver seat front fender area 310 (pixel area ①) and the front passenger seat front fender area 340 (pixel area ④) of the surround view image, the vehicle 100 may unfold the folded side mirrors 120*a* and 120*b* by determining that the passengers have also passed the side mirrors 120*a* and 120*b*, for example.

As described above, according to embodiments of the disclosure, by appropriately controlling folding/unfolding of side mirrors based on a location of a driver alone or locations of the driver and passenger(s) approaching a parked vehicle, interference between the side mirrors, which are unfolded by the welcome mirror function, and the driver and/or the passenger(s) may be prevented. Therefore, complaints of customers about the welcome mirror function may be resolved, and because an existing LF antenna and SVM system may be used, unnecessary cost increase may be prevented.

As is apparent from the above, according to embodiments of the disclosure, by appropriately controlling folding/unfolding of side mirrors based on a location of a driver/ passenger(s) approaching a parked vehicle, interference between the side mirrors, which are unfolded by a welcome mirror function, and the driver/passenger(s) may be prevented.

According to an embodiment of the disclosure, by appropriately controlling the folding/unfolding of the side mirrors based on locations of the driver and passenger(s) approaching the parked vehicle, interference between the side mirrors, which are unfolded by the welcome mirror function, and the driver and/or the passengers may be prevented.

Herein, the aforementioned controller and/or components thereof may include one or more processors/microprocessors combined with computer-readable recording medium storing computer-readable code/algorithm/software. The processors/microprocessors may execute computer-readable code/algorithm/software    stored    in    computer-readable recording medium to perform the above-described functions, operations, steps, and the like, for example.

The above-described controller and/or components thereof may further include memory implemented as computer-readable non-transitory recording medium or computer-readable temporary recording medium, for example. The memory may be controlled by the aforementioned controller and/or components thereof, and may be configured to store data transferred to or received from the aforementioned controller and/or components thereof, and/or may be configured to store data to be processed or processed by the aforementioned controller and/or components thereof, for example.

The disclosed embodiments may be implemented as computer-readable code/algorithm/software on a computer-readable recording medium, for example. The computer-readable recording medium may be computer-readable non-transitory recording medium such as a data storage device capable of storing data readable by a processor/microprocessor, for example. Examples of computer-readable recording media include hard disk drives (HDDs), solid state drives (SSDs), silicon disk drives (SDDs), read-only memory (ROM), CD-ROMs, magnetic tapes, floppy disks, optical data storage devices, and combinations thereof, for example.

What is claimed is:

1. A vehicle comprising:

a side mirror configured to be converted into a folded or unfolded state;

a communicator comprising a plurality of antennas including a first antenna mounted on a driver seat side, the communicator configured to transmit a search signal to a remote controller through the plurality of antennas and to receive a response signal transmitted from the remote controller as a response to the search signal; and a controller electrically coupled to the side mirror;

wherein the controller is configured to determine whether a driver is present within a search area of the first antenna according to detection of the driver carrying the remote controller and approaching the vehicle;

wherein the controller is configured to determine a location of the driver based on an intensity of the response signal received from the remote controller as a response to the search signal transmitted from the first antenna;

wherein the controller is configured to signal the side mirror whether to convert into the folded state or the unfolded state based on the determined location of the driver; and wherein the controller is configured to maintain the side mirror in the folded state according to the driver being in the determined location after passing the side mirror and a passenger being in a passenger detected location before passing the side mirror.

2. The vehicle according to claim 1, wherein:

the controller is configured to determine that the driver is in the determined location before passing the side mirror according to the driver being present within the search area and the intensity of the response signal being less than a threshold value; and the controller is configured to determine that the driver is in the determined location where the driver has passed the side mirror when the driver is present within the search area and the intensity of the response signal being greater than the threshold value.

3. The vehicle according to claim 2, further comprising:

a surround view camera system configured to provide a field of view facing a periphery of the vehicle and configured to obtain surrounding image data;

wherein the controller is configured to divide a surround view image created from the surrounding image data into a driver seat front fender area, a driver seat door area, a front passenger seat front fender area, and a front passenger seat door area based on the side mirror;

wherein the controller is configured to determine whether a motion is detected in the areas based on pixel changes in at least one of the areas; and wherein the controller is configured to determine whether the driver is in the determined location after passing the side mirror when the driver is present within the search area, the intensity of the response signal is greater than the threshold value, and a motion is detected in the driver seat door area.

4. The vehicle according to claim 3, wherein:

the controller is configured to determine whether the passenger is in the passenger detected location before passing the side mirror according to motion detected in at least one of the driver seat front fender area and the front passenger seat front fender area while the driver is in the determined location after passing the side mirror; and the controller is configured to determine whether the passenger is in the passenger detected location after passing the side mirror based on reduced motion detected in at least one of the driver seat front fender area and the front passenger seat front fender area.

5. The vehicle according to claim 4, wherein the controller is configured to signal the side mirror to convert from the folded state to the unfolded state according to both of the driver being at the determined location after passing the side mirror and the passenger being in the passenger detected location after passing the side mirror.

6. The vehicle according to claim 2, wherein:

the controller is configured to maintain the side mirror in the folded state according to the driver being in the determined location before passing the side mirror; and the controller is configured to signal the side mirror to convert from the folded state to the unfolded state when the driver is in the determined location after passing the side mirror.

7. The vehicle according to claim 2, wherein the controller is configured to determine whether the driver carrying the remote controller is approaching based on mounting positions of the plurality of antennas and the intensity of the response signal of the remote controller.

8. The vehicle according to claim 2, wherein the controller is configured to determine the determined location of the driver according to an interval between the vehicle and another vehicle parked on at least one of the left and right sides of the vehicle is shorter than a preset interval.

9. The vehicle according to claim 1, wherein the controller is configured to maintain the side mirror in the folded state when the driver approaches from the front of the vehicle in the direction of a front passenger seat.

10. The vehicle according to claim 1, wherein the controller is configured to signal the side mirror to convert from the folded state to the unfolded state when the driver approaches from the rear of the vehicle.

11. The vehicle according to claim 1, wherein the controller is configured to determine whether the driver carrying the remote controller is approaching based on mounting positions of the plurality of antennas and the intensity of the response signal of the remote controller.

12. The vehicle according to claim 1, wherein the controller is configured to determine the determined location of the driver according to an interval between the vehicle and another vehicle parked on at least one of the left and right sides of the vehicle is shorter than a preset interval.

13. A vehicle comprising:

a side mirror configured to be converted into a folded or unfolded state;

a communicator comprising a plurality of antennas comprising an internal antenna mounted inside of the vehicle, and the communicator being configured to transmit a search signal to a remote controller through the plurality of antennas and to receive a response signal transmitted from the remote controller as a response to the search signal;

a surround view camera system configured to provide a field of view facing a periphery of the vehicle and obtain surrounding image data; and a controller electrically coupled to the side mirror;

wherein the controller being configured to divide a surround view image created from the surrounding image data into a plurality of areas comprising a driver seat front fender area and a front passenger seat front fender area based on the side mirror;

wherein the controller being configured to determine whether motion is detected in each area based on pixel changes in at least one of the areas, while a driver carrying the remote controller is present within a search area of the internal antenna;

wherein the controller being configured to determine a location of a passenger based on a change in motion detection in at least one of the driver seat front fender area and the front passenger seat front fender area, while the driver carrying the remote controller is present within the search area of the internal antenna;

wherein the controller being configured to signal the side mirror to convert into the folded state or the unfolded state based on the determined passenger location of the passenger; and wherein the controller is configured to maintain the side mirror in the folded state according to the driver being in a determined location after passing the side mirror and the passenger being in the determined passenger location before passing the side mirror.

14. The vehicle according to claim 13, wherein:

the controller is configured to determine that the passenger is in the determined passenger location before passing the side mirror according to the motion being detected in at least one of the driver seat front fender area and the front passenger seat front fender area; and the controller is configured to determine that the passenger is in the determined passenger location after passing the side mirror based on reduced motion detected in at least one of the driver seat front fender area and the front passenger seat front fender area.

15. The vehicle according to claim 14, wherein:

the controller is configured to signal the side mirror to convert from the unfolded state to the folded state according to the passenger being in the determined passenger location before passing the side mirror; and the controller is configured to signal the side mirror to convert from the folded state to the unfolded state according to the passenger being in the determined passenger location after passing the side mirror.

16. A control method of a vehicle comprising:

determining whether a driver is present within a search area of a first antenna according to detection of the driver carrying a remote controller approaching the vehicle, wherein the vehicle comprises a side mirror configured to be converted into a folded or unfolded state, wherein the vehicle comprises a communicator comprising a plurality of antennas comprising the first antenna mounted on a driver seat side, wherein the communicator is configured to transmit a search signal to the remote controller through the plurality of antennas and to receive a response signal transmitted from the remote controller as a response to the search signal;

determining a location of the driver based on an intensity of the response signal received from the remote controller according to a response to the search signal transmitted from the first antenna; and converting the side mirror into the folded state or the unfolded state based on the determined location of the driver, wherein the converting of the side mirror into the folded state or the unfolded state comprises maintaining the side mirror in the folded state according to the driver being in the determined location after passing the side mirror and a passenger being in a determined passenger location before passing the side mirror.

17. The control method according to claim 16, wherein the determining of the location of the driver comprises:

determining that the driver is in the determined location before passing the side mirror according to the driver being present within the search area and the intensity of the response signal being less than a threshold value;

dividing a surround view image of the vehicle into a driver seat front fender area, a driver seat door area, a front passenger seat front fender area, and a front passenger seat door area based on the side mirror;

determining whether motion is detected in the areas based on pixel changes in at least one of the areas; and determining that the driver is in the determined location after passing the side mirror according to the driver being present within the search area, the intensity of the response signal being greater than the threshold value, and motion being detected in the driver seat door area.

18. The control method according to claim 17, wherein the determining of the location of the driver comprises:

determining that the passenger is in the determined passenger location before passing the side mirror according to motion being detected in at least one of the driver seat front fender area and the front passenger seat front fender area; and determining that the passenger is in the determined passenger location after passing the side mirror based on reduced motion detected in at least one of the driver seat front fender area and the front passenger seat front fender area.

19. The control method according to claim 18, wherein the converting of the side mirror into the folded state or the unfolded state comprises converting the side mirror from the folded state to the unfolded state according to both of the driver and the passenger being in locations after passing the side mirror.

20. The control method according to claim 17, wherein the converting of the side mirror into the folded state or the unfolded state comprises:

maintaining the side mirror in the folded state according to the driver being in the determined location before passing the side mirror; and converting the side mirror from the folded state to the unfolded state according to the driver being in the determined location after passing the side mirror.

* * * * *